(12) United States Patent
Harold et al.

(10) Patent No.: US 9,208,213 B2
(45) Date of Patent: *Dec. 8, 2015

(54) SYSTEM AND METHOD FOR NETWORK USER INTERFACE OLAP REPORT FORMATTING

(75) Inventors: Lee C. Harold, Arlington, VA (US); Qing Zhu, Herndon, VA (US); Herbert Liebl, Vienna (AT)

(73) Assignee: MICROSTRATEGY, INCORPORATED, Vienna, VA (US)

( * ) Notice: Subject to any disclaimer, the term of this patent is extended or adjusted under 35 U.S.C. 154(b) by 1514 days.

This patent is subject to a terminal disclaimer.

(21) Appl. No.: 11/249,369

(22) Filed: Oct. 14, 2005

(65) Prior Publication Data

US 2006/0085742 A1 Apr. 20, 2006

Related U.S. Application Data

(63) Continuation of application No. 09/321,743, filed on May 28, 1999, now abandoned.

(51) Int. Cl.
*G06F 17/21* (2006.01)
*G06F 17/30* (2006.01)
*G06F 17/24* (2006.01)

(52) U.S. Cl.
CPC .... *G06F 17/30592* (2013.01); *G06F 17/30557* (2013.01)

(58) Field of Classification Search
CPC ............................... G06F 17/246; G06F 17/00
USPC .................................. 715/212, 243, 248, 256
See application file for complete search history.

(56) References Cited

U.S. PATENT DOCUMENTS

| | | | |
|---|---|---|---|
| 4,156,868 A | 5/1979 | Levinson | |
| 4,554,418 A | 11/1985 | Toy | |

(Continued)

FOREIGN PATENT DOCUMENTS

| | | |
|---|---|---|
| CA | 2153096 | 12/1996 |
| EP | 0878948 | 11/1998 |

(Continued)

OTHER PUBLICATIONS

Elkins, Steven, "Open OLAP", DBMS Apr. 1998. Available: http://www.dbmsmag.com/9804d14.html.*

(Continued)

*Primary Examiner* — James J Debrow
(74) *Attorney, Agent, or Firm* — Pillsbury Winthrop Shaw Pittman LLP

(57) ABSTRACT

A network-based system for enabling users connected over the network to an OLAP system to select formatting options for reports requested for processing by the OLAP system. The system enables a user to select the format for each report in a workbook or for a stand-alone report. The format specified may be multiple levels of format that are applied in a hierarchical manner including global formats that apply to all reports in a workbook, report formats which apply to specific reports in the workbooks, attribute/element/metric formats which apply to specific attributes, elements, and metrics of a report, and value formats which apply to specific values within an element of a report. The formats specified may also comprise merged report formats, combined grid and graphs within a report and an autoformat that enables each recipient of the report to specify the format in which that recipient views the report when the report is received.

28 Claims, 7 Drawing Sheets

(56) References Cited

U.S. PATENT DOCUMENTS

| | | |
|---|---|---|
| 4,667,065 A | 5/1987 | Bangerter |
| 4,757,525 A | 7/1988 | Matthews et al. |
| 4,775,936 A | 10/1988 | Jung |
| 4,785,408 A | 11/1988 | Britton et al. |
| 4,788,643 A | 11/1988 | Trippe et al. |
| 4,811,379 A | 3/1989 | Grandfield |
| 4,812,843 A | 3/1989 | Champion, III et al. |
| 4,837,798 A | 6/1989 | Cohen et al. |
| 4,868,866 A | 9/1989 | Williams, Jr. |
| 4,931,932 A | 6/1990 | Dalnekoff et al. |
| 4,941,168 A | 7/1990 | Kelly, Jr. |
| 4,942,616 A | 7/1990 | Linstroth et al. |
| 4,953,085 A | 8/1990 | Atkins |
| 4,972,504 A | 11/1990 | Daniel, Jr. et al. |
| 4,974,252 A | 11/1990 | Osborne |
| 4,989,141 A | 1/1991 | Lyons et al. |
| 5,021,953 A | 6/1991 | Webber et al. |
| 5,101,352 A | 3/1992 | Rembert |
| 5,128,861 A | 7/1992 | Kagami et al. |
| 5,131,020 A | 7/1992 | Liebesny et al. |
| 5,168,445 A | 12/1992 | Kawashima et al. |
| 5,187,735 A | 2/1993 | Herrero Garcia et al. |
| 5,189,608 A | 2/1993 | Lyons et al. |
| 5,195,086 A | 3/1993 | Baumgartner et al. |
| 5,204,821 A | 4/1993 | Inui et al. |
| 5,214,689 A | 5/1993 | O'Sullivan |
| 5,235,680 A | 8/1993 | Bijnagte |
| 5,237,499 A | 8/1993 | Garback |
| 5,255,184 A | 10/1993 | Hornick et al. |
| 5,270,922 A | 12/1993 | Higgins |
| 5,272,638 A | 12/1993 | Martin et al. |
| 5,283,731 A | 2/1994 | Lalonde et al. |
| 5,323,452 A | 6/1994 | Dickman et al. |
| 5,331,546 A | 7/1994 | Webber et al. |
| 5,333,180 A | 7/1994 | Brown et al. |
| 5,347,632 A | 9/1994 | Filepp et al. |
| 5,367,454 A | 11/1994 | Kawamoto et al. |
| 5,371,787 A | 12/1994 | Hamilton |
| 5,404,400 A | 4/1995 | Hamilton |
| 5,406,626 A | 4/1995 | Ryan |
| 5,422,809 A | 6/1995 | Griffin et al. |
| 5,430,792 A | 7/1995 | Jesurum et al. |
| 5,444,768 A | 8/1995 | Lemaire et al. |
| 5,452,341 A | 9/1995 | Sattar |
| 5,457,904 A | 10/1995 | Colvin |
| 5,479,491 A | 12/1995 | Herrero Garcia et al. |
| 5,493,606 A | 2/1996 | Osder et al. |
| 5,500,793 A | 3/1996 | Deming, Jr. et al. |
| 5,500,920 A | 3/1996 | Kupiec |
| 5,502,637 A | 3/1996 | Beaulieu et al. |
| 5,524,051 A | 6/1996 | Ryan |
| 5,539,808 A | 7/1996 | Inniss et al. |
| 5,548,636 A | 8/1996 | Bannister et al. |
| 5,555,403 A | 9/1996 | Cambot et al. |
| 5,559,927 A | 9/1996 | Clynes |
| 5,572,643 A | 11/1996 | Judson |
| 5,572,644 A | 11/1996 | Liaw et al. |
| 5,576,951 A | 11/1996 | Lockwood |
| 5,577,165 A | 11/1996 | Takebayashi et al. |
| 5,581,602 A | 12/1996 | Szlam et al. |
| 5,583,922 A | 12/1996 | Davis et al. |
| 5,590,181 A | 12/1996 | Hogan et al. |
| 5,594,789 A | 1/1997 | Seazholtz et al. |
| 5,594,791 A | 1/1997 | Szlam et al. |
| 5,604,528 A | 2/1997 | Edwards et al. |
| 5,610,910 A | 3/1997 | Focsaneanu et al. |
| 5,630,060 A | 5/1997 | Tang et al. |
| 5,636,325 A | 6/1997 | Farrett |
| 5,638,424 A | 6/1997 | Denio et al. |
| 5,638,425 A | 6/1997 | Meador, III et al. |
| 5,644,624 A | 7/1997 | Caldwell |
| 5,652,789 A | 7/1997 | Miner et al. |
| 5,659,298 A | 8/1997 | Brooks et al. |
| 5,661,781 A | 8/1997 | DeJager |
| 5,664,115 A | 9/1997 | Fraser |
| 5,684,992 A | 11/1997 | Abrams et al. |
| 5,689,650 A | 11/1997 | McClelland et al. |
| 5,692,181 A | 11/1997 | Anand et al. |
| 5,694,459 A | 12/1997 | Backaus et al. |
| 5,701,451 A | 12/1997 | Rogers et al. |
| 5,706,442 A | 1/1998 | Anderson et al. |
| 5,710,889 A | 1/1998 | Clark et al. |
| 5,712,668 A | 1/1998 | Osborne et al. |
| 5,712,901 A | 1/1998 | Meermans |
| 5,715,370 A | 2/1998 | Luther et al. |
| 5,717,923 A | 2/1998 | Dedrick |
| 5,721,827 A | 2/1998 | Logan et al. |
| 5,724,410 A | 3/1998 | Parvulescu et al. |
| 5,724,420 A | 3/1998 | Torgrim |
| 5,724,520 A | 3/1998 | Goheen |
| 5,724,525 A | 3/1998 | Beyers, II et al. |
| 5,732,216 A | 3/1998 | Logan et al. |
| 5,732,398 A | 3/1998 | Tagawa |
| 5,737,393 A | 4/1998 | Wolf |
| 5,740,421 A | 4/1998 | Palmon |
| 5,740,429 A | 4/1998 | Wang et al. |
| 5,740,829 A | 4/1998 | Jacobs et al. |
| 5,742,775 A | 4/1998 | King |
| 5,748,959 A | 5/1998 | Reynolds |
| 5,751,790 A | 5/1998 | Makihata |
| 5,751,806 A | 5/1998 | Ryan |
| 5,754,858 A | 5/1998 | Broman et al. |
| 5,754,939 A | 5/1998 | Herz et al. |
| 5,757,644 A | 5/1998 | Jorgensen et al. |
| 5,758,088 A | 5/1998 | Bezaire et al. |
| 5,758,351 A | 5/1998 | Gibson et al. |
| 5,761,432 A | 6/1998 | Bergholm et al. |
| 5,764,736 A | 6/1998 | Shachar et al. |
| 5,765,028 A | 6/1998 | Gladden |
| 5,765,143 A | 6/1998 | Sheldon et al. |
| 5,771,172 A | 6/1998 | Yamamoto et al. |
| 5,771,276 A | 6/1998 | Wolf |
| 5,781,735 A | 7/1998 | Southard |
| 5,781,886 A | 7/1998 | Tsujiuchi |
| 5,787,151 A | 7/1998 | Nakatsu et al. |
| 5,787,278 A | 7/1998 | Barton et al. |
| H1743 H | 8/1998 | Graves et al. |
| 5,790,935 A | 8/1998 | Payton |
| 5,790,936 A | 8/1998 | Dinkins |
| 5,793,980 A | 8/1998 | Glaser et al. |
| 5,794,207 A | 8/1998 | Walker et al. |
| 5,794,246 A | 8/1998 | Sankaran et al. |
| 5,797,124 A | 8/1998 | Walsh et al. |
| 5,799,063 A | 8/1998 | Krane |
| 5,799,156 A | 8/1998 | Hogan et al. |
| 5,802,159 A | 9/1998 | Smolentzov et al. |
| 5,802,488 A | 9/1998 | Edatsune |
| 5,802,526 A | 9/1998 | Fawcett et al. |
| 5,806,050 A | 9/1998 | Shinn et al. |
| 5,809,113 A | 9/1998 | Lieuwen |
| 5,809,415 A | 9/1998 | Rossmann |
| 5,809,483 A | 9/1998 | Broka et al. |
| 5,812,987 A | 9/1998 | Luskin et al. |
| 5,819,220 A | 10/1998 | Sarukkai et al. |
| 5,819,293 A * | 10/1998 | Comer et al. ................. 707/203 |
| 5,822,405 A | 10/1998 | Astarabadi |
| 5,825,856 A | 10/1998 | Porter et al. |
| 5,828,731 A | 10/1998 | Szlam et al. |
| 5,832,451 A | 11/1998 | Flake et al. |
| 5,838,252 A | 11/1998 | Kikinis |
| 5,838,768 A | 11/1998 | Sumar et al. |
| 5,848,396 A | 12/1998 | Gerace |
| 5,848,397 A | 12/1998 | Marsh et al. |
| 5,850,433 A | 12/1998 | Rondeau |
| 5,852,811 A | 12/1998 | Atkins |
| 5,852,819 A * | 12/1998 | Beller ............................... 707/1 |
| 5,854,746 A | 12/1998 | Yamamoto et al. |
| 5,857,181 A | 1/1999 | Augenbraun et al. |
| 5,857,191 A | 1/1999 | Blackwell, Jr. et al. |
| 5,860,064 A | 1/1999 | Henton |
| 5,862,325 A | 1/1999 | Reed et al. |
| 5,864,605 A | 1/1999 | Keshav |
| 5,864,827 A | 1/1999 | Wilson |
| 5,864,828 A | 1/1999 | Atkins |

(56) References Cited

U.S. PATENT DOCUMENTS

| | | |
|---|---|---|
| 5,867,153 A | 2/1999 | Grandcolas et al. |
| 5,870,454 A | 2/1999 | Dahlen |
| 5,870,724 A | 2/1999 | Lawlor et al. |
| 5,870,746 A | 2/1999 | Knutson et al. |
| 5,872,921 A | 2/1999 | Zahariev et al. |
| 5,872,926 A | 2/1999 | Levac et al. |
| 5,873,032 A | 2/1999 | Cox et al. |
| 5,873,057 A | 2/1999 | Eves et al. |
| 5,878,403 A | 3/1999 | DeFrancesco et al. |
| 5,880,726 A | 3/1999 | Takiguchi et al. |
| 5,884,262 A | 3/1999 | Wise et al. |
| 5,884,266 A | 3/1999 | Dvorak |
| 5,884,285 A | 3/1999 | Atkins |
| 5,884,312 A | 3/1999 | Dustan et al. |
| 5,890,140 A | 3/1999 | Clark et al. |
| 5,893,079 A | 4/1999 | Cwenar |
| 5,893,262 A | 4/1999 | Harbach |
| 5,893,905 A | 4/1999 | Main et al. |
| 5,897,620 A | 4/1999 | Walker et al. |
| 5,907,598 A | 5/1999 | Mandalia et al. |
| 5,907,837 A | 5/1999 | Ferrel et al. |
| 5,911,135 A | 6/1999 | Atkins |
| 5,911,136 A | 6/1999 | Atkins |
| 5,913,195 A | 6/1999 | Weeren et al. |
| 5,913,202 A | 6/1999 | Motoyama |
| 5,914,878 A | 6/1999 | Yamamoto et al. |
| 5,915,001 A | 6/1999 | Uppaluru |
| 5,915,238 A | 6/1999 | Tjaden |
| 5,918,213 A | 6/1999 | Bernard et al. |
| 5,918,217 A | 6/1999 | Maggioncalda et al. |
| 5,918,225 A | 6/1999 | White et al. |
| 5,918,232 A | 6/1999 | Pouschine et al. |
| 5,920,848 A | 7/1999 | Schutzer et al. |
| 5,923,736 A | 7/1999 | Shachar |
| 5,924,068 A | 7/1999 | Richard et al. |
| 5,926,789 A | 7/1999 | Barbara et al. |
| 5,931,900 A | 8/1999 | Notani et al. |
| 5,931,908 A | 8/1999 | Gerba et al. |
| 5,933,484 A | 8/1999 | Partridge, III |
| 5,933,816 A | 8/1999 | Zeanah et al. |
| 5,940,818 A | 8/1999 | Malloy et al. |
| 5,943,395 A | 8/1999 | Hansen |
| 5,943,399 A | 8/1999 | Bannister et al. |
| 5,943,410 A | 8/1999 | Shaffer et al. |
| 5,943,677 A | 8/1999 | Hicks |
| 5,945,989 A | 8/1999 | Freishtat et al. |
| 5,946,485 A | 8/1999 | Weeren et al. |
| 5,946,666 A | 8/1999 | Nevo et al. |
| 5,946,711 A | 8/1999 | Donnelly |
| 5,948,040 A | 9/1999 | DeLorme et al. |
| 5,950,165 A | 9/1999 | Shaffer et al. |
| 5,953,392 A | 9/1999 | Rhie et al. |
| 5,953,406 A | 9/1999 | LaRue et al. |
| 5,956,693 A | 9/1999 | Geerlings |
| 5,960,437 A | 9/1999 | Krawchuk et al. |
| 5,963,625 A | 10/1999 | Kawecki et al. |
| 5,963,641 A | 10/1999 | Crandall et al. |
| 5,970,122 A | 10/1999 | LaPorta et al. |
| 5,970,124 A | 10/1999 | Csaszar et al. |
| 5,974,398 A | 10/1999 | Hanson et al. |
| 5,974,406 A | 10/1999 | Bisdikian et al. |
| 5,974,441 A | 10/1999 | Rogers et al. |
| 5,978,232 A | 11/1999 | Jo |
| 5,978,766 A | 11/1999 | Luciw |
| 5,978,796 A | 11/1999 | Malloy et al. |
| 5,983,184 A | 11/1999 | Noguchi |
| 5,987,415 A | 11/1999 | Breese et al. |
| 5,987,586 A | 11/1999 | Byers |
| 5,990,885 A | 11/1999 | Gopinath |
| 5,991,365 A | 11/1999 | Pizano et al. |
| 5,995,596 A | 11/1999 | Shaffer et al. |
| 5,995,945 A | 11/1999 | Notani et al. |
| 5,996,006 A | 11/1999 | Speicher |
| 5,999,526 A | 12/1999 | Garland et al. |
| 6,002,394 A | 12/1999 | Schein et al. |
| 6,003,009 A | 12/1999 | Nishimura |
| 6,006,225 A | 12/1999 | Bowman et al. |
| 6,009,383 A | 12/1999 | Mony |
| 6,009,410 A | 12/1999 | LeMole et al. |
| 6,011,579 A | 1/2000 | Newlin |
| 6,011,844 A | 1/2000 | Uppaluru et al. |
| 6,012,045 A | 1/2000 | Barzilai et al. |
| 6,012,066 A | 1/2000 | Discount et al. |
| 6,012,083 A | 1/2000 | Savitzky et al. |
| 6,014,427 A | 1/2000 | Hanson et al. |
| 6,014,428 A | 1/2000 | Wolf |
| 6,014,429 A | 1/2000 | LaPorta et al. |
| 6,016,335 A | 1/2000 | Lacy et al. |
| 6,016,336 A | 1/2000 | Hanson |
| 6,016,478 A | 1/2000 | Zhang et al. |
| 6,018,710 A | 1/2000 | Wynblatt et al. |
| 6,018,715 A | 1/2000 | Lynch et al. |
| 6,020,916 A | 2/2000 | Gerszberg et al. |
| 6,021,181 A | 2/2000 | Miner et al. |
| 6,021,397 A | 2/2000 | Jones et al. |
| 6,023,714 A | 2/2000 | Hill et al. |
| 6,026,087 A | 2/2000 | Mirashrafi et al. |
| 6,029,195 A | 2/2000 | Herz |
| 6,031,836 A | 2/2000 | Haserodt |
| 6,035,336 A | 3/2000 | Lu et al. |
| 6,038,561 A | 3/2000 | Snyder et al. |
| 6,038,601 A | 3/2000 | Lambert et al. |
| 6,041,359 A | 3/2000 | Birdwell |
| 6,044,134 A | 3/2000 | De La Huerga |
| 6,047,264 A | 4/2000 | Fisher et al. |
| 6,047,327 A | 4/2000 | Tso et al. |
| 6,049,812 A | 4/2000 | Bertram et al. |
| 6,055,505 A | 4/2000 | Elston |
| 6,055,513 A | 4/2000 | Katz et al. |
| 6,055,514 A | 4/2000 | Wren |
| 6,058,166 A | 5/2000 | Osder et al. |
| 6,061,433 A | 5/2000 | Polcyn et al. |
| 6,064,980 A | 5/2000 | Jacobi et al. |
| 6,067,348 A | 5/2000 | Hibbeler |
| 6,067,535 A | 5/2000 | Hobson et al. |
| 6,073,140 A | 6/2000 | Morgan et al. |
| 6,078,924 A | 6/2000 | Ainsbury et al. |
| 6,078,994 A | 6/2000 | Carey |
| 6,081,815 A | 6/2000 | Spitznagel et al. |
| 6,094,651 A | 7/2000 | Agrawal et al. |
| 6,094,655 A | 7/2000 | Rogers et al. |
| 6,097,791 A | 8/2000 | Ladd et al. |
| 6,101,241 A | 8/2000 | Boyce et al. |
| 6,101,443 A | 8/2000 | Kato et al. |
| 6,101,473 A | 8/2000 | Scott et al. |
| 6,104,798 A | 8/2000 | Lickiss et al. |
| 6,108,686 A | 8/2000 | Williams, Jr. |
| 6,115,686 A | 9/2000 | Chung et al. |
| 6,115,693 A | 9/2000 | McDonough et al. |
| 6,119,095 A | 9/2000 | Morita |
| 6,122,628 A | 9/2000 | Castelli et al. |
| 6,122,636 A | 9/2000 | Malloy et al. |
| 6,125,376 A | 9/2000 | Klarlund et al. |
| 6,131,184 A | 10/2000 | Weeren et al. |
| 6,134,563 A | 10/2000 | Clancey et al. |
| 6,144,848 A | 11/2000 | Walsh et al. |
| 6,144,938 A | 11/2000 | Surace et al. |
| 6,151,572 A | 11/2000 | Cheng et al. |
| 6,151,582 A | 11/2000 | Huang et al. |
| 6,151,601 A | 11/2000 | Papierniak et al. |
| 6,154,527 A | 11/2000 | Porter et al. |
| 6,154,766 A | 11/2000 | Yost et al. |
| 6,157,705 A | 12/2000 | Perrone |
| 6,163,774 A | 12/2000 | Lore et al. |
| 6,167,379 A | 12/2000 | Dean et al. |
| 6,167,383 A | 12/2000 | Henson |
| 6,169,894 B1 | 1/2001 | McCormick et al. |
| 6,173,266 B1 | 1/2001 | Marx et al. |
| 6,173,310 B1 | 1/2001 | Yost et al. |
| 6,173,316 B1 | 1/2001 | De Boor et al. |
| 6,178,446 B1 | 1/2001 | Gerszberg et al. |
| 6,181,935 B1 | 1/2001 | Gossman et al. |
| 6,182,052 B1 | 1/2001 | Fulton et al. |
| 6,182,053 B1 | 1/2001 | Rauber et al. |

(56) References Cited

U.S. PATENT DOCUMENTS

| | | | |
|---|---|---|---|
| 6,182,153 | B1 | 1/2001 | Hollberg et al. |
| 6,185,558 | B1 | 2/2001 | Bowman et al. |
| 6,189,008 | B1 | 2/2001 | Easty et al. |
| 6,192,050 | B1 | 2/2001 | Stovall |
| 6,199,082 | B1 | 3/2001 | Ferrel et al. |
| 6,201,948 | B1 | 3/2001 | Cook et al. |
| 6,203,192 | B1 | 3/2001 | Fortman |
| 6,209,026 | B1 | 3/2001 | Ran et al. |
| 6,215,858 | B1 | 4/2001 | Bartholomew et al. |
| 6,219,643 | B1 | 4/2001 | Cohen et al. |
| 6,223,983 | B1 | 5/2001 | Kjonaas et al. |
| 6,226,360 | B1 | 5/2001 | Goldberg et al. |
| 6,233,609 | B1 | 5/2001 | Mittal |
| 6,236,977 | B1 | 5/2001 | Verba et al. |
| 6,240,391 | B1 | 5/2001 | Ball et al. |
| 6,243,092 | B1 | 6/2001 | Okita et al. |
| 6,243,445 | B1 | 6/2001 | Begeja et al. |
| 6,246,672 | B1 | 6/2001 | Lumelsky |
| 6,246,981 | B1 | 6/2001 | Papineni et al. |
| 6,253,062 | B1 | 6/2001 | Leyendecker |
| 6,253,146 | B1 | 6/2001 | Hanson et al. |
| 6,256,659 | B1 | 7/2001 | McLain, Jr. et al. |
| 6,259,443 | B1 | 7/2001 | Williams, Jr. |
| 6,260,050 | B1 | 7/2001 | Yost et al. |
| 6,263,051 | B1 | 7/2001 | Saylor et al. |
| 6,266,681 | B1 | 7/2001 | Guthrie |
| 6,269,151 | B1 | 7/2001 | Hanson |
| 6,269,336 | B1 | 7/2001 | Ladd et al. |
| 6,269,393 | B1 | 7/2001 | Yost et al. |
| 6,275,746 | B1 | 8/2001 | Leatherman et al. |
| 6,279,000 | B1 | 8/2001 | Suda et al. |
| 6,279,033 | B1 | 8/2001 | Selvarajan et al. |
| 6,279,038 | B1 | 8/2001 | Hogan et al. |
| 6,286,030 | B1 | 9/2001 | Wenig et al. |
| 6,289,352 | B1 | 9/2001 | Proctor |
| 6,292,811 | B1 | 9/2001 | Clancey et al. |
| 6,301,590 | B1 | 10/2001 | Siow et al. |
| 6,304,850 | B1 | 10/2001 | Keller et al. |
| 6,311,178 | B1 | 10/2001 | Bi et al. |
| 6,313,734 | B1 | 11/2001 | Weiss et al. |
| 6,314,094 | B1 | 11/2001 | Boys |
| 6,314,402 | B1 | 11/2001 | Monaco et al. |
| 6,314,533 | B1 | 11/2001 | Novik et al. |
| 6,317,750 | B1 | 11/2001 | Tortolani et al. |
| 6,321,190 | B1 | 11/2001 | Bernardes et al. |
| 6,321,198 | B1 | 11/2001 | Hank et al. |
| 6,321,221 | B1 | 11/2001 | Bieganski |
| 6,324,262 | B1 | 11/2001 | Tuttle |
| 6,327,343 | B1 | 12/2001 | Epstein et al. |
| 6,334,103 | B1 | 12/2001 | Surace et al. |
| 6,334,133 | B1 | 12/2001 | Thompson et al. |
| 6,336,124 | B1 | 1/2002 | Alam et al. |
| 6,341,271 | B1 | 1/2002 | Salvo et al. |
| 6,341,286 | B1 | 1/2002 | Kawano |
| 6,349,290 | B1 | 2/2002 | Horowitz et al. |
| 6,360,139 | B1 | 3/2002 | Jacobs |
| 6,363,393 | B1 | 3/2002 | Ribitzky |
| 6,366,298 | B1 | 4/2002 | Haitsuka et al. |
| 6,380,954 | B1 | 4/2002 | Gunther |
| 6,385,191 | B1 | 5/2002 | Coffman et al. |
| 6,385,301 | B1 | 5/2002 | Nolting et al. |
| 6,385,583 | B1 | 5/2002 | Ladd et al. |
| 6,389,398 | B1 | 5/2002 | Lustgarten et al. |
| 6,397,387 | B1 | 5/2002 | Rosin et al. |
| 6,400,804 | B1 | 6/2002 | Bilder |
| 6,400,938 | B1 | 6/2002 | Biedermann |
| 6,404,858 | B1 | 6/2002 | Farris et al. |
| 6,404,877 | B1 | 6/2002 | Bolduc et al. |
| 6,405,171 | B1 | 6/2002 | Kelley |
| 6,411,685 | B1 | 6/2002 | O'Neal |
| 6,412,012 | B1 | 6/2002 | Bieganski et al. |
| 6,415,269 | B1 | 7/2002 | Dinwoodie |
| 6,426,942 | B1 | 7/2002 | Sienel et al. |
| 6,430,545 | B1 | 8/2002 | Honarvar et al. |
| 6,434,524 | B1 | 8/2002 | Weber |
| 6,438,217 | B1 | 8/2002 | Huna |
| 6,442,560 | B1 | 8/2002 | Berger et al. |
| 6,442,598 | B1 | 8/2002 | Wright et al. |
| 6,445,694 | B1 | 9/2002 | Swartz |
| 6,456,699 | B1 | 9/2002 | Burg et al. |
| 6,456,974 | B1 | 9/2002 | Baker et al. |
| 6,459,427 | B1 | 10/2002 | Mao et al. |
| 6,459,774 | B1 | 10/2002 | Ball et al. |
| 6,466,654 | B1 | 10/2002 | Cooper et al. |
| 6,473,612 | B1 | 10/2002 | Cox et al. |
| 6,477,549 | B1 | 11/2002 | Hishida et al. |
| 6,480,842 | B1 | 11/2002 | Agassi et al. |
| 6,482,156 | B2 | 11/2002 | Iliff |
| 6,487,277 | B2 | 11/2002 | Beyda et al. |
| 6,487,533 | B2 | 11/2002 | Hyde-Thomson et al. |
| 6,490,564 | B1 | 12/2002 | Dodrill et al. |
| 6,490,593 | B2 | 12/2002 | Proctor |
| 6,493,447 | B1 | 12/2002 | Goss et al. |
| 6,493,685 | B1 | 12/2002 | Ensel et al. |
| 6,496,568 | B1 | 12/2002 | Nelson |
| 6,501,832 | B1 | 12/2002 | Saylor et al. |
| 6,507,817 | B1 | 1/2003 | Wolfe et al. |
| 6,513,019 | B2 | 1/2003 | Lewis |
| 6,515,968 | B1 | 2/2003 | Combar et al. |
| 6,519,562 | B1 | 2/2003 | Phillips et al. |
| 6,522,727 | B1 | 2/2003 | Jones |
| 6,526,575 | B1 | 2/2003 | McCoy et al. |
| 6,539,359 | B1 | 3/2003 | Ladd et al. |
| 6,549,612 | B2 | 4/2003 | Gifford et al. |
| 6,567,796 | B1 * | 5/2003 | Yost et al. ......................... 707/2 |
| 6,571,281 | B1 | 5/2003 | Nickerson |
| 6,574,605 | B1 | 6/2003 | Sanders et al. |
| 6,578,000 | B1 | 6/2003 | Dodrill et al. |
| 6,587,547 | B1 | 7/2003 | Zirngibl et al. |
| 6,587,822 | B2 | 7/2003 | Brown et al. |
| 6,591,263 | B1 | 7/2003 | Becker et al. |
| 6,594,682 | B2 | 7/2003 | Peterson et al. |
| 6,600,736 | B1 | 7/2003 | Ball et al. |
| 6,604,135 | B1 * | 8/2003 | Rogers et al. ................ 709/217 |
| 6,606,596 | B1 | 8/2003 | Zirngibl et al. |
| 6,658,093 | B1 | 12/2003 | Langseth et al. |
| 6,658,432 | B1 | 12/2003 | Alavi et al. |
| 6,671,716 | B1 | 12/2003 | Diedrichsen et al. |
| 6,697,103 | B1 | 2/2004 | Fernandez et al. |
| 6,697,824 | B1 | 2/2004 | Bowman-Amuah |
| 6,697,964 | B1 | 2/2004 | Dodrill et al. |
| 6,707,889 | B1 | 3/2004 | Saylor et al. |
| 6,741,967 | B1 | 5/2004 | Wu et al. |
| 6,741,995 | B1 | 5/2004 | Chen et al. |
| 6,748,066 | B1 | 6/2004 | Espejo et al. |
| 6,754,233 | B1 | 6/2004 | Henderson et al. |
| 6,757,362 | B1 | 6/2004 | Cooper et al. |
| 6,760,412 | B1 | 7/2004 | Loucks |
| 6,763,300 | B2 | 7/2004 | Jones |
| 6,765,997 | B1 | 7/2004 | Zirngibl et al. |
| 6,768,788 | B1 | 7/2004 | Langseth et al. |
| 6,785,592 | B1 | 8/2004 | Smith et al. |
| 6,788,768 | B1 | 9/2004 | Saylor et al. |
| 6,792,086 | B1 | 9/2004 | Saylor et al. |
| 6,798,867 | B1 | 9/2004 | Zirngibl et al. |
| 6,826,593 | B1 | 11/2004 | Acharya et al. |
| 6,829,334 | B1 | 12/2004 | Zirngibl et al. |
| 6,836,537 | B1 | 12/2004 | Zirngibl et al. |
| 6,850,603 | B1 | 2/2005 | Eberle et al. |
| 6,873,693 | B1 | 3/2005 | Langseth et al. |
| 6,885,734 | B1 | 4/2005 | Eberle et al. |
| 6,885,736 | B2 | 4/2005 | Uppaluru |
| 6,888,929 | B1 | 5/2005 | Saylor et al. |
| 6,895,084 | B1 | 5/2005 | Saylor et al. |
| 6,940,953 | B1 | 9/2005 | Eberle et al. |
| 6,964,012 | B1 | 11/2005 | Zirngibl et al. |
| 6,975,835 | B1 | 12/2005 | Lake et al. |
| 6,977,992 | B2 | 12/2005 | Zirngibl et al. |
| 6,993,476 | B1 | 1/2006 | Dutta et al. |
| 7,020,251 | B2 | 3/2006 | Zirngibl et al. |
| 7,065,188 | B1 | 6/2006 | Mei et al. |
| 7,082,422 | B1 * | 7/2006 | Zirngibl et al. ................ 706/45 |
| 7,110,952 | B2 | 9/2006 | Kursh |
| 7,130,800 | B1 | 10/2006 | Currey et al. |

(56) References Cited

U.S. PATENT DOCUMENTS

| | | | |
|---|---|---|---|
| 7,165,098 B1 | 1/2007 | Boyer et al. | |
| 7,197,461 B1 | 3/2007 | Eberle et al. | |
| 7,225,249 B1 | 5/2007 | Barry et al. | |
| 7,266,181 B1 | 9/2007 | Zirngibl et al. | |
| 7,272,212 B2 | 9/2007 | Eberle et al. | |
| 7,330,847 B2 | 2/2008 | Saylor et al. | |
| 7,340,040 B1 | 3/2008 | Saylor et al. | |
| 7,379,540 B1 | 5/2008 | Van Gundy | |
| 7,401,046 B2 | 7/2008 | Hollderman et al. | |
| 7,428,302 B2 | 9/2008 | Zirngibl et al. | |
| 7,440,898 B1 | 10/2008 | Eberle et al. | |
| 7,486,780 B2 | 2/2009 | Zirngibl et al. | |
| 7,552,054 B1 | 6/2009 | Stifelman et al. | |
| 7,571,226 B1 | 8/2009 | Partovi et al. | |
| 7,676,368 B2 | 3/2010 | Shizuka et al. | |
| 7,716,055 B1 | 5/2010 | McIntosh et al. | |
| 7,881,443 B2 | 2/2011 | Langseth et al. | |
| 8,051,369 B2 | 11/2011 | Zirngibl et al. | |
| 8,094,788 B1 | 1/2012 | Eberle et al. | |
| 8,130,918 B1 | 3/2012 | Zirngibl et al. | |
| 8,321,411 B2 * | 11/2012 | Yost et al. | 707/732 |
| 8,607,138 B2 | 12/2013 | Harold et al. | |
| 8,995,628 B2 | 3/2015 | Zirngibl et al. | |
| 2001/0012335 A1 | 8/2001 | Kaufman et al. | |
| 2002/0006126 A1 | 1/2002 | Johnson et al. | |
| 2002/0059373 A1 | 5/2002 | Boys | |
| 2002/0065752 A1 | 5/2002 | Lewis | |
| 2002/0067808 A1 | 6/2002 | Agraharam et al. | |
| 2003/0088872 A1 | 5/2003 | Maissel et al. | |
| 2003/0101201 A1 * | 5/2003 | Saylor et al. | 707/200 |
| 2004/0128514 A1 | 7/2004 | Rhoads | |
| 2004/0133907 A1 | 7/2004 | Rodriguez et al. | |
| 2006/0080277 A1 * | 4/2006 | Nador | 707/1 |
| 2006/0085742 A1 * | 4/2006 | Harold et al. | 715/517 |
| 2006/0129499 A1 * | 6/2006 | Combar et al. | 705/64 |
| 2006/0282408 A1 | 12/2006 | Wisely et al. | |
| 2012/0166185 A1 | 6/2012 | Zirngibl et al. | |

FOREIGN PATENT DOCUMENTS

| | | |
|---|---|---|
| EP | 0889627 | 1/1999 |
| WO | WO 94/15294 | 7/1994 |

OTHER PUBLICATIONS

Chaudari, Surajit and Umeshwar Dayal, "An Overview of Data Warehousing and OLAP Technology", ACM SIGMOD Record, vol. 26, Issue 1, Mar. 1997, pp. 65-74.*
MSTR168—"Travelocity.com—airline tickets, hotel accommodations and car reservation online" [online], Feb. 9, 1999 [retrieved on Jan. 10, 2006]. Retrieved from the Internet: <URL:http://web.archive.org/web/19990209191411/www2.travelocity.com/ttools/freqtrav.html.
MSTR171—"Southwest Airlines Home Gate" [online], Apr. 16, 1999 [retrieved on Oct. 3, 2006]. Retrieved from the Internet: <URL:http://web.archive/org/web/19990418061835/southwest.com/luvhome.html>, 19 pages.
MSTR172—Mukherjee et al., "A New Voice-Data Integrated Protocol for Unidirectional Broadcast Bus Networks", *IEEE*, Mar. 1988, pp. 813-822.
MSTR173—Brent, Paul, "GlobeStar Mates PCs with the Telephone", *Financial Post*, Apr. 13, 1996, Toronto, Ontario, p. T.13.
MSTR174—Stevens, Kimberly, "What's This? Reserved Seats at the Movies?", *New York Times*, Jan. 11, 1998, New York, New York, p. 9.5, 2 pages.
MSTR175—Stedman, Craig, "Warehouses Send Answers in E-Mail", *Computer World*, vol. 32, No. 13, Mar. 30, 1998, pp. 53-54.
MSTR176—Thyfault, Mary E., "Voice Recognition Enters the Mainstream", *Information Week*, No. 639, Jul. 14, 1997, p. 20.
MSTR177—Dillon, Nancy, "Will U.S. Sanctions Restrict Indian Coders?", *Computer World*, vol. 32, No. 23, Jun. 8, 1998, p. 20.

MSTR178—Fairbank, Katie, "At Your Command Voice-Prompted Software Assists Fliers via Computer", *Fort Worth Star—Telegram*, Fort Worth, Texas, Aug. 10, 1998, ProQuest, p. 1.
MSTR179—Sherter, Alain, "Are Banks Flirting with Disaster?", *Bank Technology News*, vol. 12, No. 8, Aug. 1999, Speech recognition speaks volumes, 4 pages.
MSTR180—Schmandt, Chris, "Phoneshell: The Telephone as Computer Terminal", M.I.T. Media Laboratory, Aug. 1993, 10 pages.
MSTR181—"Amaxis Announces Information Broadcasting Applications for the Pharmaceutical Industry; MicroStrategy's DSS Broadcaster Used to Deliver Information to Pharmaceutical Sales Managers", Business Editors & Technology Writers, *Business Week*, New York, Aug. 11, 1998, ProQuest, 2 pages.
MSTR182—"MicroStrategy Announces 35-city Seminar Series with IBM on How to Deliver Personalized Business Intelligence Throughout the Enterprise Using DSS Broadcaster", Business Editors, *Business Wire*, New York, Jul. 22, 1998, ProQuest, 3 pages.
MSTR183—Callaghan, Dennis, "MicroStrategy House Broadcasts Data to Enterprise", *Midrange Systems*, Spring House, vol. 11, Issue 15, Oct. 19, 1998, ProQuest, p. 58.
MSTR184—"MicroStrategy Introduces DSS Broadcaster—The Industry's First Information Broadcast Server", Business Editors/Computer Writers, *Business Wire*, New York, Mar. 23, 1998, ProQuest, 4 pages.
MSTR185—Davis, Beth, "PeopleSoft Readies Update to ERP Apps", *Information Week*, No. 751, Personalized information, Sep. 6, 1999, p. 24.
MSTR186—MicroStrategy.com web pages, MicroStrategy, Inc., Feb. 1999, 13 pages. Available in Internet Archive Wayback Machine, search for http://www.microstrategy.com.
MSTR187—Anonymous, "IBM's SpeechML is All Talk", *Web Techniques*, San Francisco, May 1999, vol. 4, Issue 5, p. 13, 2 pages.
MSTR188—Seneff, Stephanie, et al., "Interactive Problem Solving and Dialogue in the ATIS Domain", Human Language Technology Conference, Proceedings of the Workshop on Speech and Natural Language, 1991, pp. 354-359, 9 pages.
MSTR189—Sheth, Beerud, et al., "Evolving Agents for Personalized Information Filtering", *Proceedings of the Ninth Conference on Artificial Intelligence for Applications*, Mar. 1-5, 1993, pp. 345-352.
MSTR190—"Microsoft Intranet Strategy Whitepaper", Microsoft Corporation, Jun. 1996, pp. 1-24.
Advertisement for Progressive Telecommunications Corporation's OPUS (date unknown).
KnowledgeX Workgroup Edition Publication (date unknown).
Relational OLAP Server, MicroStrategy; DSS Server Brochure, 1996.
Relational OLAP Interface for the Web, 1996.
"*Andyne Introduces Greater Flexibility for Database Queries; New Query Management Option Provides Enhanced Management for Enterprise-Wide Queries,*" Business Wire, Jan. 3, 1996, Available from the Dow Jones Interactive Web Site http://Ptg.djnr.com.
Catalano, Carla, "*OLAP, Scheduling, Tuning for DBMSs,*" Computer World, Apr. 1, 1996. Available in Dow Jones Interactive, http://www.dowjonesinteractive.com.
*Andyne's Intranet Strategy Brings DSS to the Web; Company Aims to Dramatically Broaden Scope of Reporting, Online Analysis*, PR Newswire, Sep. 18, 1996. Available from the Dow Jones Interactive Web Site http://Ptg.djnr.com.
Sachs et al., "*A First Step on the Path to Automated Flight Reservations*" Interactive Voice Technology for Telecommunications, 1996.
Bennacef et al., "Dialog in the RAILTEL Telephone-Based System," Spoken Language, 1996.
Brooks, Peter, "Targeting Customer," DBMS, v9, n13, Dec. 1996, pp. 54-58.
"*Sterling Software Announces Alliance with Thinking Machines,*" Business Wire Dec. 16, 1996. Available from the Dow Jones Interactive Web Site http://Ptg.djnr.com.
Gupta et al., "*Index Selection for Olap,*" Proceedings of the 13th International Conference on Data Engineering, © 1997.
Ho et al., "Partial-Sum Queries in OLAP Data Cubes Using Covering Codes," PODS'97 Tucson, AZ USA.

(56) References Cited

OTHER PUBLICATIONS

Kilmartin et al., "*Real Time Stock Price Distribution Utilising the GSM Short Messaging Service*," 1997 IEEE International Conference on Personal Wireless, 1997, Abstract.

Data Warehousing: Data Access and Delivery, Infobase Technology Database, 1997, http://www.dbaint.com/oldinfobase/dwaccdel.html.

Gardner, Dana Marie, "*Cashing in With Data Warehouses and the Web*," Data Based Advisor, v15, n2, Feb. 1997, pp. 60-63.

*Intrepid Systems Announces General Availability of DecisionMaster 4.1; Retailing's Premier Decision Support Software Enhancements Automate Information Delivery*, Business Wire, May 27, 1997. Available in Dow Jones Interactive, http.//www.dowjonesinteractive.com.

Blue Isle Software InTouch/2000 Product Overview, Blue Isle Software, Inc. (archived Jul. 7, 1997), http://www.blueisle.com. Available in Internet Archive Waybackmachine http://www.archive.org.

"*Blue Isle Software Teams with Arbor Software to Deliver Automated Systems Management Capabilities for Arbor Essbase*," Business Wire, Oct. 29, 1997. Available in Lexis, Nexis Library, ALLNWS file.

"*Early Warning: Compulogic's Dynamic Query Messenger*," Software Futures, Nov. 1, 1997. Available in Lexis, Nexis Library, ALLNWS file.

Kilmartin et al., "Development of an Interactive Voice Response System for a GSM SMS Based Share Price Server," DSP '97 Conference Proceedings, Dec. 1997, Abstract.

Avnur et al., "*CONTROL: Continuous Output and Navigation Technology with Refinement On-Line*," © 1998.

Liang et al., "Computing Multidimensional Aggregates in Parallel," 1998 International Conference on Parallel and Distributed Systems, IEEE.

Friel et al., *An Automated Stock Price Delivery System Based on the GSM Short Message Service*, ICC'98 1998 IEEE International Conference on Communications, 1998, Abstract.

Microstrategy Products and Services, 1998.

Personalized Information Broadcast Server, 1998.

"*Information Advantage Wins Product of the Year Award for Knowledge Management*," Business Wire, Mar. 4, 1998. Available in LEXIS, Nexis Library, ALLNWS file.

Emigh, Jacqueline, "*Information Builders, Inc. Launches WebFocus Suit*," Newbytes Mar. 10, 1998. Available in Northern Light, http://www.northernlight.com, Doc. ID BS19980311010000172.

Microstrategy: DSS Broadcaster—The Industry's First Information Broadcast Server, M2 Presswire, Mar. 20, 1998. Available in Dow Jones Interactive http://www.djinteractive.com.

Microstrategy Introduces DSS Broadcaster—The Industry's First Information Broadcast Server, Mar. 23, 1998. http://strategy.com/newsandevent/New/PressRelease/1998/broadcaster.htm.

Microstrategy Introduces DSS Broadcaster—The Industry's First Information Broadcast Server, Mar. 23, 1998. http://www.strategy.com/newsandevents/News/PressReleases/1998/broadcaster.htm.

"*MSNBC on the Internet Launches New Traffic Section; MSNBC.com and Sidewalk.com Team with TrafficStation for Production of Comprehensive Site for Drivers*," Financial News, Redmond, Wash., Apr. 15, 1998.

Prospectus—4,000,000 Shares Microstrategy Class A Common Stock, Jun. 11, 1998.

"*System for Telephone Access to Internet Applications—Uses Dial Tones and/or Voice with Interactive Voice Response Unit to Pass Request to Processor that Converts Requests to Communication Protocol Command Set*," IBM, Patent No. RD 98412088. Jul. 20, 1998, Abstract.

Relational OLAP Interface, Programmer's Reference and SDK Guide, Version 5.0, Aug. 1998.

Data Warehouse Dossier, Fall 1998.

"Microstrategy Announces Enhanced Versions of DSS Web and DSS Server," Oct. 26, 1998, http://www.strategy.com/NewsandEvents/news/pressreleases/1998/server5.5.htrn.

System Guide DSS Web Version 5.5, Feb. 1999.

Developer Guide DSS Web Version 5.5, Feb. 1999.

Media Output Book, v2.0, Feb. 16, 1999.

Computer Telephony, from www.telecomlibrary.com—Sep. 9, 1999.

Frequently Asked Questions About DSS Web, printed Feb. 23, 1999, http://www.strategy.com/products/Web/faq.htm.

"*Traffic Station Extends Service to Six New Markets in North America, Reaching its Goal of 20 Markets by the New Millennium*," Business Editors/Multimedia & Transportation Writers, Los Angeles, Dec. 23, 1999.

Traffic Station Corporate Information, http://www.trafficstation.com/home/corporate.html, Jan. 10, 2001.

Newswire, "Net Phones to Outsell Laptops by 2002", Dec. 2, 1998, Dialog File #03635692.

RCR Radio Communications Report, "Comverse Developing Unified Applications for GSM Smartphone Marketplace", Feb. 23, 1998, vol. 17, No. 8, p. 106, Dialog File #02078693.

America's Network, "Wireless Web Browsing: How Long Will Deployment Take? (There Will be 22 Mil Devices Other than PCs Accessing the Internet by 2000)", Dec. 15, 1996, vol. 100, No. 24, p. 30+, Dialog File #01708089.

Adali et al., "Query Caching and Optimization in Distributed Mediator Systems", SIGMOD '96, Jun. 1996, Montreal, Canada, pp. 137-148.

Alur et al., "Directory-Driven Information Delivery", DataBase Associates Int'l, Jul. 1996, printed from http://webarchive.org on Jan. 7, 2002, 12 pages.

Chawathe et al., "Representing and Querying Changes in Semistructured Data", Proceedings of the 14$^{th}$ International Conference on Data Engineering, IEEE, Feb. 23-27, 1998, pp. 4-13.

Codd et al., "Providing OLAP (On-line Analytical Processing) to User-Analysts; an IT Mandate", San Jose, California, Codd and Date, 1993, 1 page.

Flohr, "Using Web-Based Applications to Perform On-Line Analytical Processing Builds on the Strengths of Both Technologies", OLAP by Web Sep. 1997, 8 pages.

Gesmann et al., "A Remote Cooperation System Supporting Interoperability in Heterogeneous Environments", Proceedings of the Third International Workshop on Research Issued in Data Engineering, IEEE, Apr. 19-20, 1993, pp. 152-160.

Hackathorn, "Solutions to Overworked Networks and Unruly Software Distribution are Just Part of P&S.", Publish or Perish Sep. 1997, 21 pages.

Liscano et al., "Integrating Multi-Modal Messages across Heterogeneous Networks", IEEE, 1997, pp. 45-53, Abstract.

Liu et al., "Differential Evaluation of Continual Queries", Proceedings of the 16$^{th}$ International Conference on Distributed Computing Systems, IEEE, May 27-30, 1996, pp. 458-465.

Newing, "Relational Databases Are Not Suitable for Management Information Systems: and That's Official!", Management Accounting London, vol. 72, No. 8, Sep. 1994, 4 pages.

Raden, "Teraforming the Data Warehouse", Archer Decision Sciences, printed from http://www.archer-decision.com on Jan. 16, 2002, 13 pages.

Schreier et al., Alert: An Architecture for Transforming a Passive DBMS into an Active DBMS, Proceedings of the 17$^{th}$ International Conference on Very Large Data Bases, Sep. 3-6, 1991, pp. 469-478.

Schultz, "ADEPT—The Advanced Database Environment for Planning and Tracking" Bell Labs Technical Journal, Jul.-Sep. 1998, pp. 3-9.

Spofford, "Attack of the Killer APIs", Intelligent Enterprise's Database Online Programming and Design, printed from http://www.dbpd.com on Dec. 21, 2001, 10 pages.

Stonebraker et al., "On Rules, Procedures, Caching and Views in Data Base Systems", Proceedings of the 1990 ACM SIGMOD International Conference on Management of Data, May 23-25, 1990, pp. 281-290.

Terry et al., "Continuous Queries over Append-Only Databases", Proceedings of the 1992 ACM SIGMOD International Conference on Management of Data, Jun. 2-5, 1992, pp. 321-330.

Search Results from Internet Archive Wayback Machine, searched for http://www.infoadvan.com, printed from http://web.archive.org on Dec. 19, 2001, 40 pages.

Search Results from Internet Archive Wayback Machine, searched for http://www.platinum.com, printed from http://web.archive.org on Dec. 21, 2011, 17 pages.

(56) References Cited

OTHER PUBLICATIONS

ROLAP Case Studies, 30 pages (no. earlier than Sep. 1997).
"Fast and Flexible Access to Databases", Byte, Aug. 1997, pp. 53-54.
"Distributed Application Development with PowerBuilder 6.0", Manning Publications Co., printed from http://www.manning.com on Jan. 15, 2002, 12 pages.
"PowerBuilder 6.0 Questions & Answers", Manning Publications Co., printed from http://www.manning.com on Jan. 15, 2002, 13 pages.
"PowerBuilder 6.0 Questions & Answers", Manning Publications Co., printed from http://www.manning.com on Jan. 17, 2002, 2 pages.
Cheshire, "Product News—A Sea of Opportunity", Intelligent Enterprise's Database Online Programming and Design, printed from http://www.dbod.com on Jan. 17, 2002, 6 pages.
"Information Advantage—Business Intelligence", "Live Information Repository . . .", printed from http://www.infoadvan.com, on Dec. 19, 2001, 5 pages.
"Objective Data Inc.—Computer Software Consultants", Client List, printed from http://objectivedata.com/clients.htm on Jan. 15, 2002, 5 pages.
"Online Analytical Processing", printed from http://searchdatabase.techtarget.com on Jan. 18, 2002, 3 pages.
"Seagate Crystal Reports 8", printed from http://www.crystaluser.com on Dec. 28, 2001, 6 pages.
"Andyne Delivers Personal OLAP with PaBLO 4.0", Press Release, Mar. 31, 1997, Andyne Computing Limited, 5 pages.
"Andyne Announces Support for Microsoft's OLE DB for OLAP", Press Release, Sep. 10, 1997, Andyne Computing Limited, 4 pages.
"Andyne QMO—Manage Data Access", Andyne Computing, printed from http://web.archive.org on Jan. 3, 2012, 5 pages.
"The Andyne Vision—On the Road to the Integrated Solution", Andyne Computing, printed from http://web.archive.org on Jan. 3, 2002, 11 pages.
"Visual Information Access for Multidimensional Companies . . .", Andyne Corporate Profile, 2 pages, © 1996.
"MicroStrategy Announces DSS Web 5.0; DSS Web Introduces the Web-Cast of Decision Support", MicroStrategy, Jan. 5, 1998, printed Dec. 10, 2001, 2 pages.
"MicroStrategy Introduces DSS Web Standard Edition; Web Interface Provides powerful, Easy-to-Use DSS Tool for Mainstream End-User Market", MicroStrategy, Apr. 27, 1998, printed Dec. 10, 2001, 2 pages.
"MicroStrategy Advantages: Proven Multi-Tier Architecture", printed from http://web.archive.org, 4 pages, © 1995.
"MicroStrategy 'Consumerizes' the Data Warehouse with Its New 4.0 Product Line", Press Release, Jun. 24, 1996, MicroStrategy, printed from http://web.archive.org on Dec. 8, 2001, 7 pages.
"MicroStrategy Announces DSS Server 3.0", Press Release, Aug. 8, 1995, MicroStrategy, printed from http://web.archive.org on Dec. 8, 2001, 5 pages.
"MicroStrategy Announces True Relational OLAP Product Line", Press Release, Aug. 8, 1995, MicroStrategy, printed from http://web.archive.org on Dec. 8, 2001, 5 pages.
"DSS Administrator Features Overview", MicroStrategy, No. 05090297, 2 pages, © 1996, 1997.
"DSS Agent Features Overview", MicroStrategy, No. 05100896, 2 pages, © 1996.
"DSS Server Features Overview", MicroStrategy, No. 05140896, 2 pages, © 1996.
"Relational OLAP Interface", DSS Agent, MicroStrategy, 22 pages and 20 pages (no earlier than 1996).
"Relational OLAP Interface for the Web", MicroStrategy DSS Web Brochure, 4 pages, © 1995.
"Data Warehouse and DSS Management Tools", DSS Administrator, MicroStrategy, 16 pages, © 1996, 1997.
"OLE API for Custom Application Development", DSS Objects, MicroStrategy, 4 pages, © 1996.
"Arbor Software OLAP Products", Brochure, Arbor Software, 12 pages, © 1998.

"InfoTrac OneFile", Database Programming & Design, vol. 11, No. 7, Jul. 1998, 12 pages.
"Andyne GQL Version 3.3.2 Available Jul. $17^{th}$ ; Featuring Multi-Pass Reporting, Time Governors and Scripting", Business Wire, Jun. 26, 1995, Andyne Computing Limited, 4 pages.
"MicroStrategy Announces DSS Server 3.0; Three-Tier Architecture Results in Exceptional Performance and Scalability for DSS Applications", Business Wire, Aug. 8, 1995, MicroStrategy, 3 pages.
"Information Advantage Ships DecisionSuite 3.0 Business Analysis Applications for Data Warehouses", Business Wire Nov. 9, 1995, 3 pages.
"Information Advantage Announces WebOLAP; First Structured Content analysis Server for the World Wide Web", Business Wire, Feb. 5, 1996, 3 pages.
"Andyne Delivers Second Stage of the Andyne Integrated Solution", Canada NewsWire, May 13, 1996, 3 pages.
"Andyne Computing Ltd is Shipping Version 3.3.2 of Its GQL Decision Support System", CommunicationsWeek, No. 566, Jul. 17, 1995, p. 16.
"Andyne Computing Introduces New Query Management Option as Companion Product to Andyne's GQL Product", CommunicationsWeek, No. 592, Jan. 15, 1996, p. 16.
"Andyne Hopes to Benefit from Current Data Warehousing Hype with GQL Query Language", Computergram International, No. 2798, Nov. 22, 1995, 1 page.
"Andyne's GQL Makes It Easier—New Version of Reporting, Analysis Tool Unveiled" Computer Reseller News, No. 685, May 27, 1996, p. 79.
"The Right Tools", Computer Weekly, Aug. 29, 1996, 4 pages.
"4 OLAP Tools; The Common Thread is that OLAP Tools Drain Too Much Time and Energy Before You Get What You Need", Computerworld, Dec. 2, 1996, 4 pages.
"GQL", Data Management Review (DM Review) vol. 6, No. 5, May 1996, p. 47.
"DB2 Today Newsletter", Jun. 1999, 2 pages.
"GQL 3.2", DDMS, vol. 8, No. 1, Jan. 1995, 2 pages.
"Everything's Coming Up Warehouse", DBMS, Oct. 1, 1995, 3 pages.
"Query, Reporting, and Analysis Tools", DBMS vol. 9, No. 6, Jun. 15, 1996, 14 pages.
Brooks, "MCI Leverages Data Warehouse Technology to Strengthen its Marketing Campaigns", DBMS, Dec. 1996, 7 pages.
Dobson, "Data Binding in Dynamic HTML", DBMS, Mar. 1998, 12 pages.
Dodd, "Native is as Native Does", HP Professional, vol. 12, No. 12, Feb. 1998, 1 page.
"Banking's New Payoff: Speed", InformationWeek, Jan. 17, 1994, 3 pages.
"Nailing Down More Query Tools", InformationWeek, vol. 523, Apr. 17, 1995, 7 pages.
Raden, "Data, Data Everywhere", Information Week, Oct. 30, 1995, pp. 60-65.
"Back-to-Back Upgrades—Vendors Introduce Reporting, Query Tools", InformationWeek, No. 598, Sep. 23, 1996, 1 page.
"Desktop OLAP Tools—If the Tool Fits, Use It—Online Analytical Processing Tools Offer Ease of Use for Data Retrieval and Analysis with Minimal User Training", InformationWeek, No. 605, Nov. 11, 1996, 3 pages.
"Pilot Gets Serious About OLAP", Information Week, Jul. 20, 1998, pp. 55-59.
"Oracle Announces Next Generation Oracle Express Server 6.0", M2 Presswire, Aug. 7, 1996, 5 pages.
"Andyne Updates GQL", Newsbytes, Jul. 12, 1994, 1 page.
"Andyne Computing Has Released Version 3.2.2 of Its GQL Query Software for Macintosh, Windows and Unix Platforms", Newsbytes News Network, Jul. 12, 1994, 4 pages.
"Data Access is Key to Warehousing Success", Open Systems Today Oct. 3, 1994, 2 pages.
Phillips, "Crystal Eyes OLAP Engine", PC Week, vol. 13, No. 4, Jan. 29, 1996, 3 pages.
Dyck, "New Report Writer Spruces Up GQL", PC Week, vol. 14, No. 3, Jan. 20, 1997, 1 page.

(56) References Cited

OTHER PUBLICATIONS

"New Decision Suite 3.0 From Information Advantage Raises the Bar for Enterprise Decision Support", Newswire, Aug. 8, 1995, 3 pages.
"Andyne's Intranet Strategy Brings DSS to the Web; Company Aims to Dramatically Broaden Scope of Reporting, Online Analysis", PR Newswire, Sep. 18, 1996, 11 pages.
"NCR Adds OLAP Services to Extend and Expand Decision Support Capabilities of Teradata Database", PR Newswire, May 28, 1998, 3 pages.
"DecisionSuite 3.5", SoftBase Sep. 12, 1996, 2 pages.
"IBM Acquires ITI's KnowledgeX Technology to Enhance Business Intelligence Solutions", Software News, Jul. 23, 1998, 1 page.
"Microstrategy Talks Crystal Balls", Software Futures, Apr. 1, 1997, 4 pages.
"Document Agent Administrator's Guide", Revision 3, BusinessObjects, Version 4.0, pp. 1-29, © 1996.
"Document Agent Server Administrator's Guide", Revision 4, BusinessObjects, Version 4.1, pp. 1-33, © 1996, 1997.
"Getting Started with Reports", Revision 2, BusinessObjects, Version 4.0, pp. 1-53, © 1996.
"Getting Started with Reports", Revision 3, BusinessObjects, Version 4.1, pp. 1-53, © 1997.
"User's Guide", Revision 3, BusinessObjects, Version 4.0, pp. 1-251, © 1996.
"User's Guide", Revision 4, BusinessObjects, Version 4.1, pp. 1-287, © 1997.
MSTR139—"United EasyUpdate", United Airlines, printed from http://www.ual.com/page/article/0,1360,1974,00.html printed Nov. 30, 2002, 4 pages.
MSTR140—General Magic, Inc. website, printed from http://www.genmagic.com, printed Nov. 30, 2002, 16 pages.
MSTR142—Lehner, Wolfgang, "Modeling Large Scale OLAP Scenarios", University of Erlangen-Nuremberg, Dept. Of Database Systems, Germany, 1998, pp. 1-15.
MSTR143—"Sybase Announces General Availability of Warehouse Studio", PR Newswire, New York, Jun. 23, 1998, two pages.
MSTR144—Schmandt, Chris, "Phoneshell: the Telephone as Computer Terminal", Proceedings of ACM Multimedia '93, New York, Aug. 1993, pp. 373-382.
MSTR145—Roy, Deb. K., et aL, "NewsComm: A Hand-Held Interface for Interactive Access to Structured Audio", CHI '96 Conference Proceedings, Vancouver, Canada, Apr. 1996, pp. 173-180.
MSTR146—Roy, Deb Kumar, "NewsComm: A Hand-Held Device for Interactive Access to Structured Audio", Masters Thesis, MIT Media Laboratory, 1995.
MSTR147—Emnett, Keith, et al, "Synthetic News Radio", IBM Systems Journal, vol. 39, Nos. 3. & 4, 2000, pp. 646-659.
MSTR148—MicroStrategy: "MicroStrategy Announces the General Availability of DSS Broadcaster", Business Wire, Aug. 11, 1998, Proquest #32759243.
MSTR149—Intrepid Systems: "Intrepid Systems to Integrate DSS Broadcaster with Its "DecisionMaster" Decision Support Solution; Non-PC Users Benefit from Receiving High-Impact, Mission Critical Information", Business Wire, Aug. 11, 1998, Proquest #32760823.
MSTR150—MicroStrategy: "MicroStrategy's DSS Broadcaster Supports Personal Digital Assistants and Advanced Wireless Data Devices", Business Wire, Sep. 8, 1998, Proquest #33719588.
MSTR151—Mills, Mike, "Putting the Internet in Your Hand; Nokia's Phone/Palmtop Computer Offers a Glimpse of the Future", The Washington Post, Jun. 29, 1998, Proquest #30839088.
MSTR152—Spyglass Prism Concepts and Applications, 1997, Spyglass, Inc., pp. 1-8.
MSTR153—Spyglass White Paper; Spyglass Product Strategy: Making Devices work with the Web, 1997, Spyglass, Inc., pp. 1-9.
MSTR154—Kane, Margaret, "Microsoft Acquires Hotmail", ZDNet News, Dec. 30, 1997, 2 pages.
MSTR155—Emnett, Keith, et al, "Synthetic Audio Newscast", The MIT Media Laboratory, alleged date: Dec. 1998, pp. 1-2.
MSTR156 - Kylänpää, Markku, "Mobile Multimedia White Paper ", http://www.vtt.fi/tte/projects/mobmulti/mobmulti.html, last modified Oct. 12, 1998, 8 pages.
MSTR157—Ewen, Edward F., et al, "Data Warehousing in an Integrated Health System; Building the Business Case", Proceeding of the ACM First International Workshop on Data Warehousing and OLAP, 1998, pp. 47-53.
MSTR158—Zaiane, Osmar R., et al., "Discovering Web Access Patterns and Trends by Applying OLAP and Data Mining Technology on Web Logs" IEEE International Forum on Research and Technology Advances in Digital Libraries, date unavailable, pp. 19-29.
MSTR159—Kurz, Andreas, et al, "Data Warehousing within Intranet: Prototype of a Web-Based Executive Information System", Proceedings of the $8^{th}$ International Workshop on Database and Expert Systems Applications, 1997, pp. 627-632.
MSTR160—Lehn, Remi, et al., "Data Warehousing Tool's Architecture: From Multidimensional Analysis to Data Mining", IEEE Database and Expert Systems Applications, date unavailable, pp. 636-643.
MSTR161—MicroStrategy: "MicroStrategy Customers Embrace DSS Broadcaster", Business Wire, Aug. 11, 1998, 4 pages, Proquest #32763756.
MSTR162—MicroStrategy: "MicroStrategy Introduces DSS StockMarket", Business Wire, Jun. 16, 1998, 3 pages, Dialog File 20 #01940188.
MSTR163—Lucent: Gohring, Nancy: "Text-to-Speech Moves Along", Telephony, Aug. 24, 1998, v235n8pg56, 3 pages, Proquest #33418136.
MSTR164—Lucent: "Lucent Technologies Unveils Powerful New Speech Software", Business Wire, Aug. 24, 1998, 3 pages, Proquest #33311728.
MSTR165—Vertigo Delivers an Unprecedented Level of Personalized Webcasting with I-Casting, Business Wire, Mar. 10, 1997, 3 pages.
MSTR166—MicroStrategy: MicroStrategy to Launch DSS Broadcaster, M2 Presswire, Feb. 27, 1998, 2 pages.
MSTR167—Wikipedia, definition of "Push Technology", printed from http://en.wikipedia.org/wiki/Push_technology, printed on Jan. 17, 2006, 1 page.
MSTR168—"Travelocity.com-airline tickets, hotel accommodations and car reservation online" [online], Feb. 9, 1999 [retrieved on Jan. 10, 2006]. Retrieved from the Internet: <URL:http://web.archive.org/web/19990209191411/www2.travelocity.com/ttools/freqtrav.html.
MSTR171—"Southwest Airlines Home Gate" [online], Apr. 16, 1999 [retrieved on Oct. 3, 2006]. Retrieved from the Internet: <URL:http://web.archive.org/web/19990418061835/southwest.com/luvhome.html>, 19 pages.

\* cited by examiner

SYSTEM AND METHOD FOR NETWORK USER INTERFACE OLAP REPORT FORMATTING

RELATED APPLICATIONS

This application is a continuation of U.S. patent application Ser. No. 09/321,743, filed May 28, 1999 now abandoned, entitled: "SYSTEM AND METHOD FOR NETWORK USER INTERFACE OLAP REPORT FORMATTING." This application is related by subject matter to the following applications: (1) U.S. application Ser. No. 09/321,830, filed 28 May 1999, entitled "SYSTEM AND METHOD FOR ASYNCHRONOUS CONTROL OR REPORT GENERATION USING A NETWORK INTERFACE," now U.S. Pat. No. 6,279,033, issued 21 Aug. 2001; and (2) U.S. application Ser. No. 11/181,813, filed 15 Jul. 2005, entitled "SYSTEM AND METHOD FOR OLAP REPORT GENERATION WITH SPREADSHEET REPORT WITHIN THE NETWORK USER INTERFACE," which is a continuation of U.S. application Ser. No. 09/321,738, filed 28 May 1999, entitled "SYSTEM AND METHOD FOR OLAP REPORT GENERATION WITH SPREADSHEET REPORT WITHIN THE NETWORK USER INTERFACE," now abandoned.

FIELD OF THE INVENTION

This invention relates to a system and method for generating, formatting, and styling OLAP reports in a network interface.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge it to ensure all relevant information is available in a timely manner.

One known approach to addressing these and other challenges is known as data warehousing. Data warehouses and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets.

There are at least three different types of OLAP architectures—ROLAP, MOLAP, and HOLAP. ROLAP ("Relational On-Line Analytical Processing") systems are systems that use a dynamic server connected to a relational database system. Multidimensional OLAP ("MOLAP") utilizes a proprietary multidimensional database ("MDDB") to provide OLAP analyses. The main premise of this architecture is that data must be stored multidimensionally to be viewed multidimensionally. A HOLAP ("Hybrid On-Line Analytical Processing") system is a hybrid of these two.

ROLAP is a multi-tier, client/server architecture comprising a presentation tier, an application logic tier and a relational database tier. The relational database tier stores data and connects to the application logic tier. The application logic tier comprises a ROLAP engine that executes multidimensional reports from multiple end users. The ROLAP engine integrates with a variety of presentation layers, through which users perform OLAP analyses. The presentation layers enable users to provide requests to the ROLAP engine. The premise of ROLAP is that OLAP capabilities are best provided directly against a relational database, e.g., the data warehouse.

In a ROLAP system, data from transaction-processing systems is loaded into a defined data model in the data warehouse. Database routines are run to aggregate the data, if required by the data model. Indices are then created to optimize query access times. End users submit multidimensional analyses to the ROLAP engine, which then dynamically transforms the requests into SQL execution plans. The SQL is submitted to the relational database for processing, the relational query results are cross-tabulated, and a multidimensional result set is returned to the end user. ROLAP is a fully dynamic architecture capable of utilizing precalculated results when they are available, or dynamically generating results from atomic information when necessary.

The ROLAP architecture directly accesses data from data warehouses, and therefore supports optimization techniques to meet batch window requirements and to provide fast response times. These optimization techniques typically include application-level table partitioning, aggregate inferencing, denormalization of data structures, multiple fact table joins, and the use of specific RDB optimizer tactics which vary with each particular brand of relational database.

MOLAP is a two-tier, client/server architecture. In this architecture, the MDDB serves as both the database layer and the application logic layer. In the database layer, the MDDB system is responsible for all data storage, access, and retrieval processes. In the application logic layer, the MDDB is responsible for the execution of all OLAP requests. The presentation layer integrates with the application logic layer and provides an interface through which the end users view and request OLAP analyses. The client/server architecture allows multiple users to access the multidimensional database.

Information from a variety of transaction-processing systems is loaded into the MDDB System through a series of batch routines. Once this atomic data has been loaded into the MDDB, the general approach is to perform a series of batch calculations to aggregate along the orthogonal dimensions and fill the MDDB array structures. For example, revenue figures for all of the stores in a state would be added together to fill the state level cells in the database. After the array structure in the database has been filled, indices are created and hashing algorithms are used to improve query access times.

Once this compilation process has been completed, the MDDB is ready for use. Users request OLAP reports through the presentation layer, and the application logic layer of the MDDB retrieves the stored data.

The MOLAP architecture is a compilation-intensive architecture. It principally reads the precompiled data, and has limited capabilities to dynamically create aggregations or to calculate business metrics that have not been precalculated and stored.

The hybrid OLAP ("HOLAP") solution is a mix of MOLAP and relational architectures that support inquiries against summary and transaction data in an integrated fashion. The HOLAP approach enables a user to perform multi-dimensional analysis on data in the MDDB. However, if the user reaches the bottom of the multidimensional hierarchy and requires more detailed data, the HOLAP engine generates an SQL statement to retrieve the detailed data from the source relational database management system ("RDBMS") and returns it to the end user. HOLAP implementations rely on simple SQL statements to pull large quantities of data into the mid-tier, multidimensional engine for processing. This constrains the range of inquiry and returns large, unrefined result sets that can overwhelm networks with limited bandwidth.

As described above, each of these types of OLAP systems are typically client-server systems. The OLAP engine resides on the server side and a module is typically provided at a client-side to enable users to input queries and report requests to the OLAP engine. Current client-side modules are stand alone software modules that are loaded on client-side computer systems. One drawback of such systems is that a user must learn how to operate the client-side software module in order to initiate queries and generate reports.

Although various user interfaces have been developed to enable users to access the content of data warehouses through server systems, many such systems experience significant drawbacks. One system enables the user to access information using a network interface device (e.g., a web browser). Such systems provide the advantage of allowing users to access the content of a data warehouse through existing web browser applications residing on their desktop or other personal computer connected over a network to the server system. Such systems however suffer from various drawbacks.

In existing web-based user interfaces, a user inputs a query or report request through the web browser, the web browser initiates the report to the server, and waits until the report finishes before providing results back through the web browser to a user. While the web browser is waiting for the report, the web browser "locks up," thereby requiring that the user open another browser window if another site or page is desired to be opened. Accordingly, if the delay between the report initiation and completion is lengthy, some users may incorrectly assume that the delay is caused by an error, when in reality the delay may simply be caused by the complicated nature of the query. Users may become impatient and resubmit the report by selecting the reload or refresh feature of the web browser. Current systems treat each such request separately and, therefore, each time the user resubmits a request, another query for the same information is submitted to the server. Because the reason for the delay in most circumstances is the size or complexity of the query, the server is then hit with processing multiple complex or large queries simultaneously when only one such query or report is desired. Accordingly, these multiple reports tax server resources unnecessarily.

Another drawback this example illustrates is that current systems focus on requests. Accordingly, each request is treated as a different request that is submitted to the server for processing. Accordingly, identical requests initiated by different users are submitted to the server system for processing, thus utilizing the server resources twice to generate the same report. These and other drawbacks exist with current web-based data warehouse/server system user interfaces.

SUMMARY OF THE INVENTION

An object of the invention is to overcome these and other drawbacks in existing systems.

Another object of the invention is to provide a system and method for enabling formatting of OLAP reports for presentation in a network user interface.

Another object of the present invention is to provide a system and method that enables selected of predefined auto-formats that may be applied to a selected report or series of reports.

Another object of the invention is to provide a system and method for providing levels of formatting to be applied to multiple OLAP report outputs for presentation in a network user interface.

These and other objects of the present invention are realized according to various embodiments of the present invention. Accordingly, an embodiment of the present invention comprises a network-based system for enabling users connected over the network to an OLAP system to select formatting options for reports requested for processing by the OLAP system. The system enables a user to select a workbook comprising one or more reports to be requested for processing by the OLAP system. The user may also select a single stand-alone report. The system then enables a user to select the format for each report in the workbook, for one or more reports in the workbook or to a stand-alone report. The format specified may be multiple levels of format that are applied in a hierarchical manner including global formats that apply to all reports in a workbook, report formats which apply to specific reports in the workbooks, attribute/element/metric formats which apply to specific attributes, elements, and metrics of a report, and value formats which apply to specific values within an element of a report. The formats specified may also comprise merged report formats that specify the merger of two or more reports, combined grid and graphs within a report and an autoformat that enables each recipient of the report to specify the format in which that recipient views the report when the report is received.

Other objects and advantages of the present invention exist.

DETAILED DESCRIPTION OF THE PREFERRED EMBODIMENTS

Accordingly, a method of operating a network-based OLAP system is provided. The system may comprise an Internet-based web browser interface that connects users over the Internet to a web server system that connects to the OLAP server system for processing requested reports.

Figure 1:
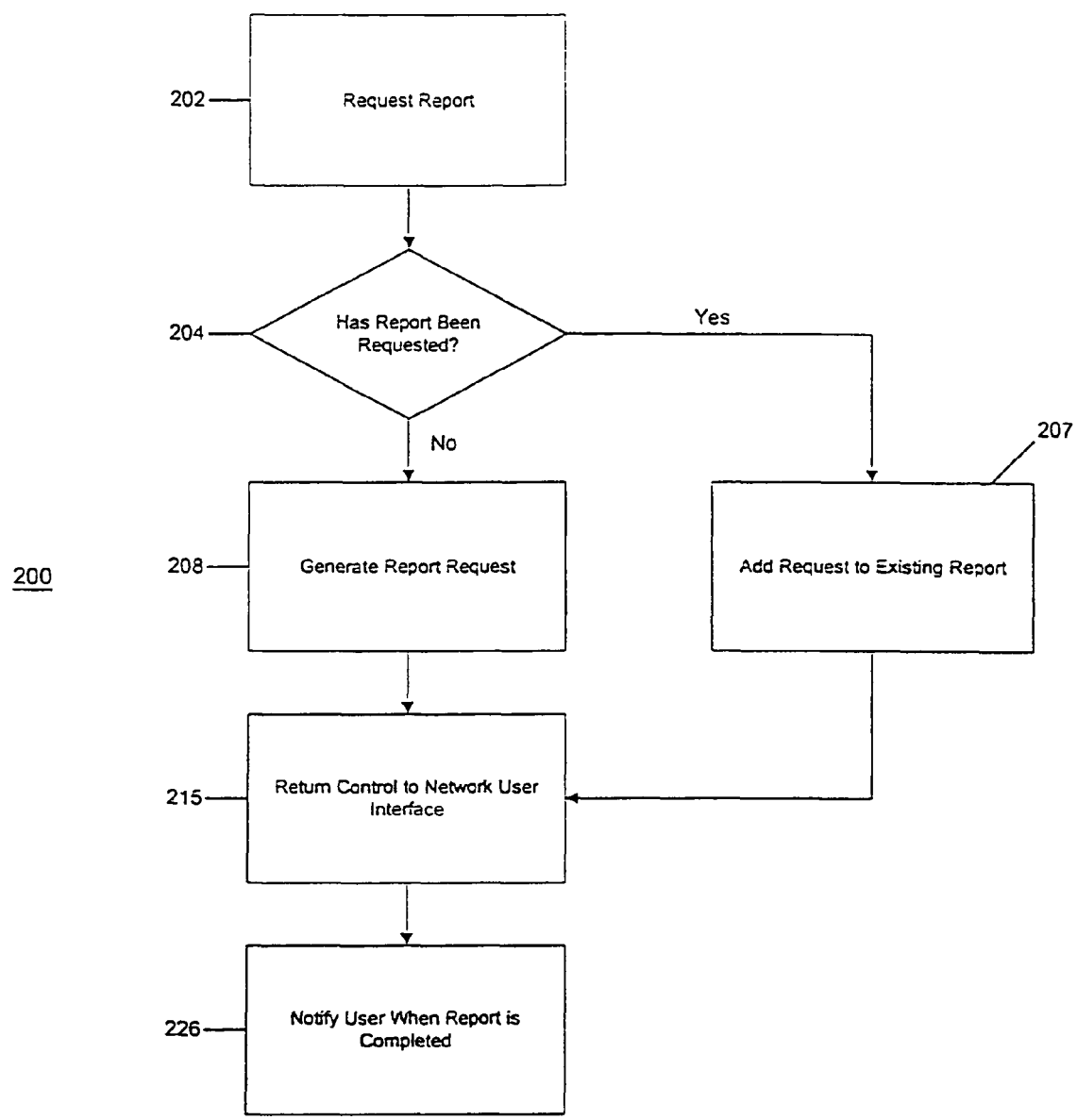
FIG. 1 is a schematic block diagram of a method for generating reports asynchronously in accordance with an embodiment of the invention.

A method 200 may be provided according to an embodiment of the present invention, as depicted in FIG. 1. In this method, a user system providing a user interface module may be connected over a network to an OLAP server system. The first step in method 200 then involves step 202 whereby the user may request the processing of a report to be run on the OLAP system through a web browser or other user interface system. The report may then be transmitted by the web browser or other user interface system to the server system such as a network module in communication with the web server.

After a report has been requested, in step 204, the system compares that report with other pending or recently completed reports for the user submitting the report and for other users connected to the system to determine if the requested report is the same as a pending or processed report. In an embodiment, if a particular report has recently been completed or is already in the queue to be processed by the server system, the system does not create a new report to be processed. Rather, in step 207, the system adds the user to the report that has already been requested so that when the previously requested report completes, then all users that requested that report receive the results. If the report has already completed, the system immediately returns the results to the user as part of steps 215 and 226. If the report has not been requested, then in step 208, a report request is generated and transmitted to the OLAP processing system.

In step 226, the system returns control of the network interface, such as a web browser or other user interface module, to the user so that the user may perform other tasks. Specifically, the server system may direct the web server to transmit a signal to enable the user to use the web browser to perform other tasks, including submission of another report. The web server may also transmit a page that informs the user that the report that was requested was received and is scheduled for processing, such as a status page as discussed below.

Then, in step 220, the system notifies the user when a report has been completed so that the user may review the results of the report. By returning control of the web browser to the user upon receipt of the report request, the system frees the user to submit multiple reports for processing in an asynchronous manner. Additional details and features of the present invention may be understood with respect to FIGS. 2-7 below.

Figure 2:
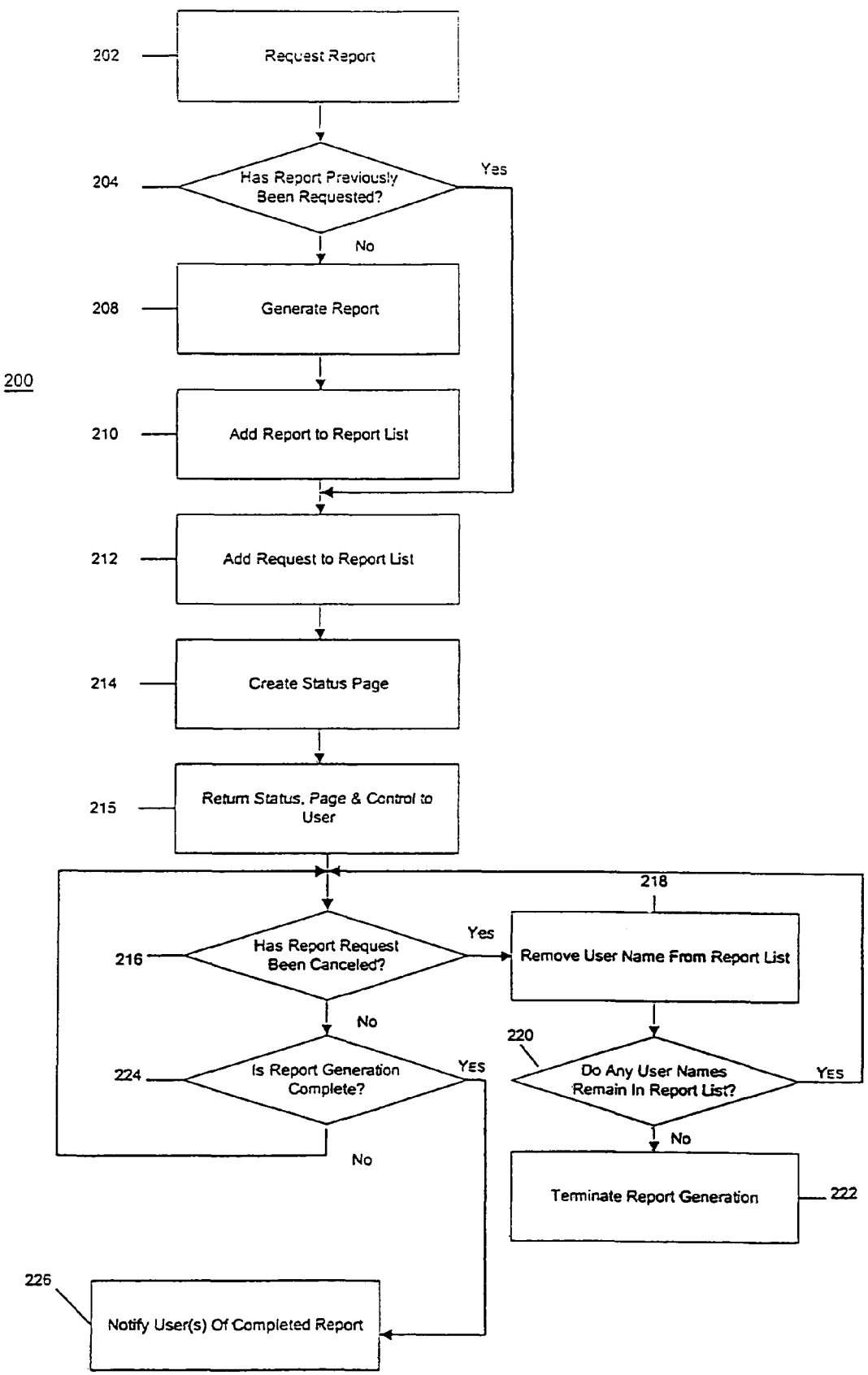
FIG. 2 is a schematic block diagram of a method for generating, monitoring, and canceling reports asynchronously in according with another embodiment of the present invention.

FIG. 2 illustrates a more detailed embodiment of method 200 in accordance with one embodiment of the invention. Specifically, in step 204, the system determines whether that report is the same, substantially the same or similar to a report that has previously been requested. To do so, the system may store or have access to all, or a certain predetermined subset of all, reports forwarded to the system within a predetermined period of time (e.g., several hours, several days, or several weeks).

In an embodiment, the system, in step 204, may compare the name of the report with the name of other reports maintained in a cache that comprise all reports already pending and reports that have been completed but not removed from the cache. Also, the system may compare the template, filter, and user view of a request to the template/filter/user view combination of other requested reports in the cache. If the template/filter/user view combination selected are identical, then the reports may be deemed to be the same.

Also, two reports may also be determined to be the same for purposes of avoiding generating a new report even if the templates or filters are not identical. For example, two reports may be deemed to be substantially the same if the template/filter/user view combination is within a predetermined range of a template/filter combination of a previously run or pending report. For example, if a report for gross sales of running shoes for March, 1999 in the U.S. has been forwarded for processing, it may be determined that a request for gross sales of a particular brand of shoes for March, 1999 in the U.S. is substantially the same or similar enough to be the same report. Other methods of determining similarity of reports to reduce the number of jobs to be processed by the system may also be used.

In step 208, if the report is different from other pending or recently completed reports, then the report is generated by placing the report in the processing queue in a known manner. Additionally, the report may be added to a report list in step 210. The report list may comprise a list of all reports generated within a predetermined period of time and may include pending and completed reports. The report list may contain a report entry for each report containing the names or identifier(s) of system users that have requested that report. The report entry for each report may also contain additional information if desired (e.g., complete request parameters, user id, requests GUID, electronic mail address, employee numbers, metadata user id, project name, report types (prompt or non-prompt), auto-prompt selections, report description, report name, filter name, template name, folder name, requested time, submitted time, completed time, filter details, status, and operators being applied (such as AND, OR, and NOT)). Whether the report is new or previously requested, the request is then added to the report entry for the report in step 212. The request may include user name and/or other identification, grid/graph selected, time requested, etc. to identify the request.

Figure 4:
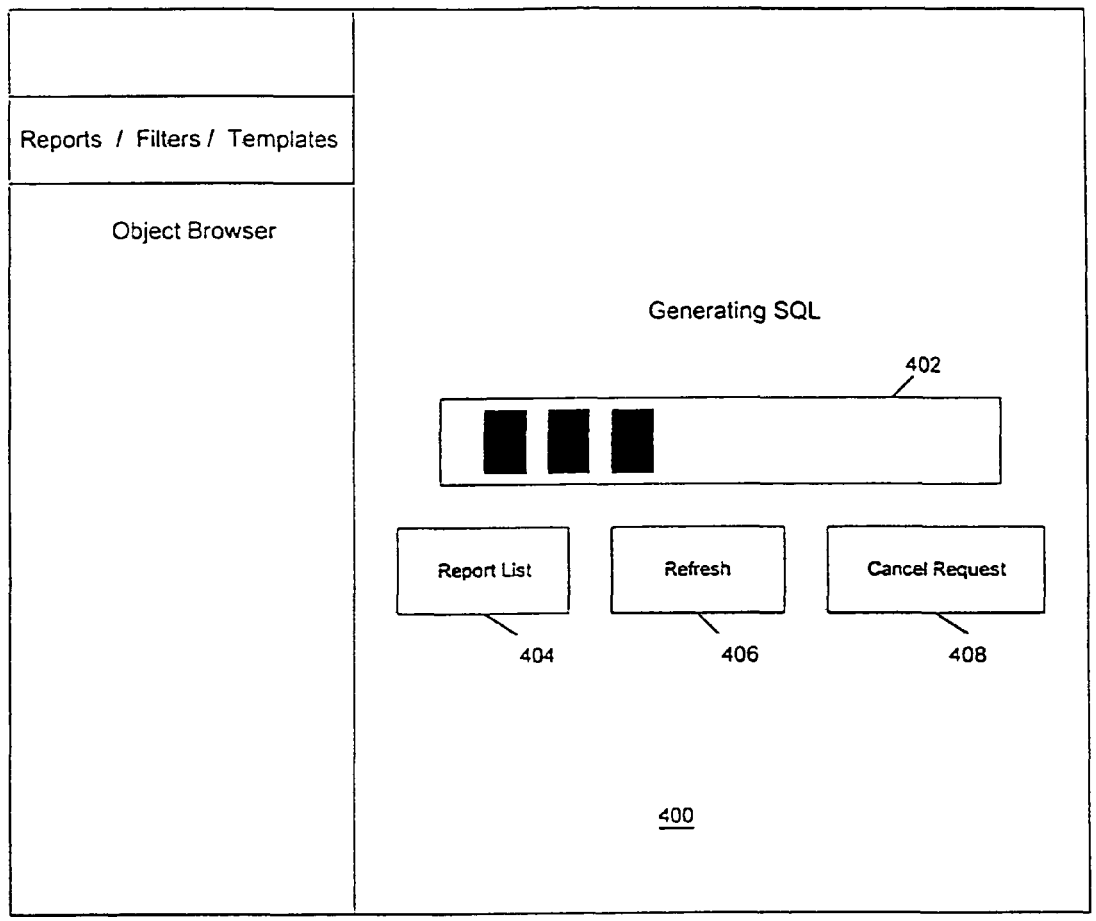
FIG. 4 is a schematic illustration of a status page in accordance with an embodiment of the invention.

It may also be desirable to notify the user of the status of the report request so in step 214, a status page may be generated. Therefore, in step 214, a status page may be generated and presented to the user by the system over the network. The status page may identify the name of the report, date and time submitted, and/or any other additional information. An example of a status page is depicted in FIG. 4. The status page may be displayed as a separate window and may be accessed by the user through viewing a report list for that user as described below. At this point, the system may enable the user to request another report, view old reports or perform other types of actions.

The status page may also enable the user to cancel a particular request, as for example, illustrated in FIG. 4 and described below. The user may also be able to cancel a report from a user report list, as for example, the user report list shown in FIG. 3, such as by clicking on the report entry and selecting a cancel icon, pull-down menu option, or other mechanism for canceling a report.

By treating each report separately and asynchronously, a report may be canceled at any time. As each report may have multiple users that have been added to that report, however, in one embodiment, a report is not canceled from the queue at the system until all users that have been added to that report have canceled. If a user cancels the report, the user's name or id is removed from the report entry for that report and that canceled user then cannot access the report results unless they resubmit another request for the report. The details of this process are depicted in steps 216-226.

Specifically, in step 216, the system determines whether a report request has been canceled. If a report request has been canceled by a user, the system removes the request for that from the report list in step 218. After removing the user from the report entry for that report, the system, in step 220, determines whether any users remain in the report entry for that canceled report. If any user names remain, method 200 returns to step 216. If no other user names remain in the report entry, the system terminates the report and deletes it from the queue of reports being processed by the server system in step 222.

If, in step 216, a report request has not been canceled, the system determines whether any of the reports are complete in step 224. If a report is complete, in step 226 the system notifies all of the system users identified in the report list for that report that the report has been completed. Notification may be made using e-mail, facsimile, pager, through the web interface such as through the web browser or other user interface module using push technology, etc. or any other mechanism as described below.

If the report generation is not complete, in step 224 the system returns to step 216 to determine whether any report request cancellations have been entered into the system. This continues until the report generation is complete and all systems users are notified that the report generation is complete for all reports on the system. The process may involve polling whereby steps 216 and 224 are performed on a predetermined schedule, such as every seven seconds or so. Other schedules may also be used.

Method 200 provides numerous advantages for generating reports. Receiving report requests and processing those requests asynchronously enables users to operate other applications while a report is being generated. Additionally, by focusing on the identity of the report rather than a request for that report, duplicative report generation is minimized. Therefore, if several users request the same report, only one report is generated.

Figure 3:
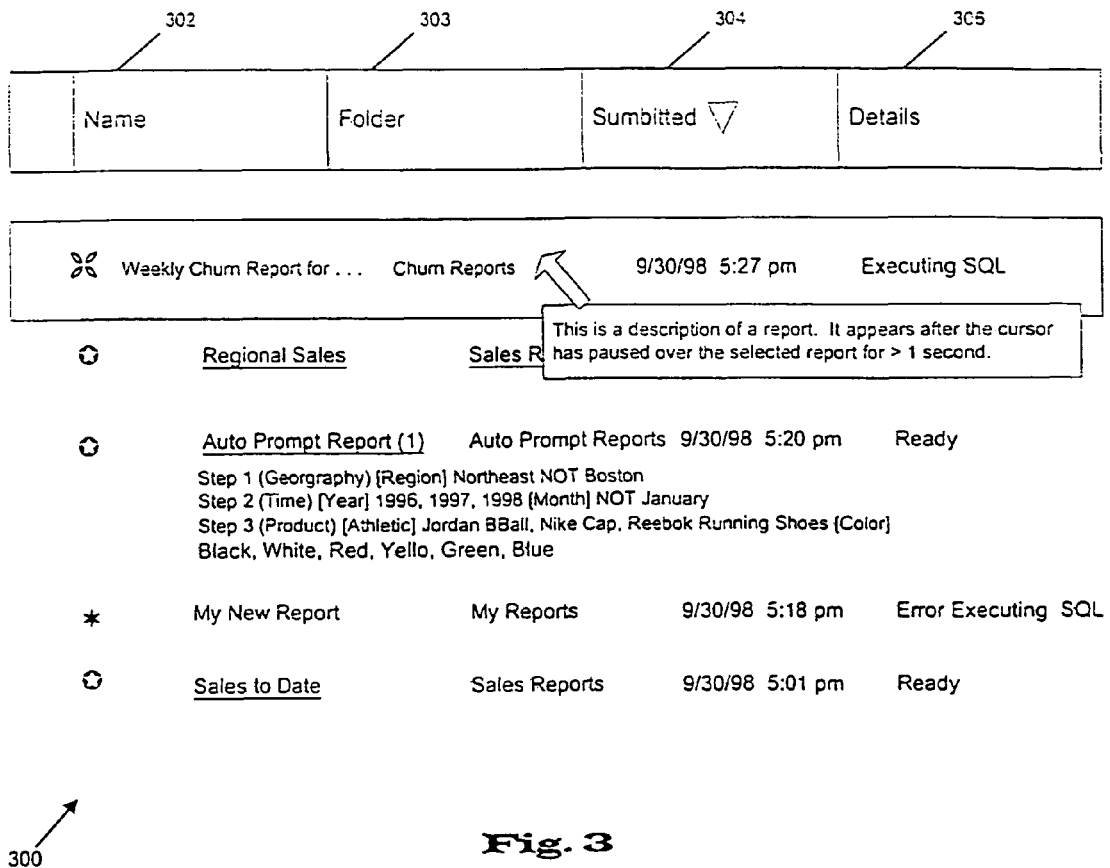
FIG. 3 is a schematic illustration of a report list in accordance with one embodiment of the invention.

FIG. 3 illustrates a user-specific report list 300 in accordance with an embodiment of the invention. Report list 300 may contain a report list for reports submitted for a specific user within a predetermined period of time. That time may be a particular log-in session or a discrete time interval for example. For each report, report list 300 may contain a "name" field 302 which identifies the name of the report being generated. A folder field 303 may be provided for indicating the folder or other category that the report may be organized. A "submitted" field 304 may be used to identify the date and/or time the report request was submitted. Other fields, for example, a "details" field 306 may be used to provide additional information, such as, the status of the report. Fields 302-306 may be sorted according to various criteria (e.g., ascending or descending order) by, for example clicking on a field using a conventional computer mouse. It is to be understood that report list 300 may be sorted according to the value of a field (e.g., user, date, report, etc.). A status field may also be provided and contain information as described below with respect to FIG. 4. Further, various icons or other symbols may be used to indicate the status or type of report.

As FIG. 3 depicts, various types of reports may be processed according to the present invention and these different report types may be displayed differently in report list 300. For example, an auto-prompt report may be provided with details of the prompting to show the filters, metrics, what information has been drilled on, what was selected in the prompt, other filter details, and other parameters selected for the report.

As discussed above, to notify the user that the request has been received and is being processed, a status page may be presented to the user. A status page may be used to display the progress of a report being generated and a user-specific report list may be viewed.

FIG. 4 illustrates a status page 400 in accordance with one embodiment of the invention. Status page 400 provides a view displaying the current status of a report's execution cycle. The execution cycle identifies the progress of a report generation (e.g., 10% complete, Error, complete with errors, pending, complete, sending request, generating SQL, submitting job request, request in queue, running report, retrieving results, cross-tabbing data, formatting data, report complete, error running report, report canceled, m of n reports completed). Status page 400 may contain a graphical display 402 of the progress of the report generation on a percentage complete basis. Selectable icons may also be displayed within status page 400. For example, a report list icon 404 may be displayed which enables a user to display a report list. A "refresh" icon 406 may be used to manually update the progress of the report generation. As described in further detail below, this operation may be automated and set by a user. Additionally, a "cancel request" icon may be displayed which permits a user to cancel the generation of a requested report.

A refresh status page rate may be set by a system user or by a system administrator. The system maintains a master list of requested reports and stores the list on a server. The master list may be refreshed when caches expire, a report is canceled, or a report is removed from a cache for another reason, etc.

A system administrator master report list may also be provided according to the present invention and enabled through network output module 22. The administrator report list may be similar to user report list 300 but may additionally comprise entries for each report to identify the users that have requested that report. Further, the system administrator report list may comprise all reports run within a predetermined period of time and may be broken out project by project if desired. The report list may provide a mechanism that enables a system administrator to delete entire reports, groups of reports, to delete a particular user or groups of users from a particular report or modify the order of reports in the queue. The administrator may thereby control reports submitted to the server system. In one embodiment, all such reports may be stored in a cache and the master report list may contain all cached reports plus all pending reports.

The information in the history list may include the name of the request, the report display mode (graph or grid), the date and time the request was last submitted, the status of the request, the users who have submitted the request and their identifiers or keys, filter details for report requests, and workbook report names for workbook requests. The administrator may refresh the list, delete a request or view details about a request. The details may include the filters and templates requested.

According to another embodiment of the present invention, users may be able to submit requests for workbooks to be processed by the server system on data in the data warehouse. A workbook may comprise complex reports that generally comprise a plurality of reports and template/filter combinations that are collected to be generated as a large complex report. Therefore, as the term "report" as used herein should be understood to comprise a single template/filter combination run against data in the data warehouse or a collection of one or more "reports" in a format known as a "workbook."

Generally, to generate a workbook request, the user logs into the server system through username and password combinations. The user interface then presents the user with options for designing a new workbook or modifying an existing workbook. To add a new workbook or modify an existing one, the user identifies the workbook (e.g., by naming it), and then selects one or more predefined reports or template/filter combinations to be included in the workbook. The user also selects the sequence of the reports and template/filter combinations. The server system may present the available reports and template/filter combinations by accessing the data warehouse, as for example, with a ROLAP engine by displaying the available table entries from the relational database structure in the data warehouse. Auto-prompted and drill-down reports may also be included in a workbook.

A workbook is processed as a collection of reports, with each report being processed and then when all reports in the workbook are complete, the workbook is formulated and the users requesting the workbook are then notified. The reports in a workbook may be processed asynchronously or sequentially depending on the types of reports.

According to an embodiment of the present invention, the user may specify the format of each report in the workbook or to a stand-alone report being requested. As such, predefined or user defined formats may be selected and have that format map to many formatting settings. For example, the user may pick the "elegant" auto-format, which may be defined by a combination of fonts, styles, colors, banding, spacing, etc. The entire report or workbook for which that format is selected may then have the "elegant" auto-format applied. In this embodiment the system may enable the user to select between multiple levels of formats that are applied in a hierarchical fashion. For example, four levels of formats may be specified as follows.

The highest level format may be a global format that applies to all reports in the workbook. Global reporting provides the base level of formatting or a default for all reports that are not otherwise specified. Global formatting may be over-ridden by lower levels of formats. This formatting applied may be, for example, formatting used in GridX Auto-Format. Formats that may be selected as global formats include an AutoFormat style that applies a format to all reports in the workbook, and server or client macros that run when the workbook is executed by the OLAP system. Server macros allow the user to manipulate the workbook report data before it is returned to the browser on the user system. After being run once on the OLAP server, the workbook may be cached for all users of the system to access and manipulate the workbook through the use of server macros. Client macros may be launched to automatically manipulate the display of data already returned to the user interface system, such as a browser, to make additional functionality available. Global formats may also include provision of a worksheet for performance and error handling including debug mode and log statistics.

The next lower level format may be a report level format. In this level, the formats specified apply only to a particular report and not to other reports in the workbook. This format may position a report within a workbook or worksheet and select an Auto Format for a report.

Autoformat comprises predefined format styles by specifying parameters for an ActiveX type application, for example. The parameters include name, gridline, font, banding. Gridline defines which of the following gridline properties apply to the report: topbar, bottombar, leftbar, rightbar, topsep, leftsep, totalssep, hgrid, and vgrid. Font defines which of the following font properties apply: genfont, toplabel, leftlabel, valuefont, totalslabel, totalsvalue, leveltop, levelleft, and levelvalue. Banding defines which of the following banding properties are applied: level, width, darkcolor, lightcolor, and inlabel.

The topbar gridline property determines the content of the top gridline of the report. The bottombar gridline determines the content of the bottom gridline of the report. The leftbar gridline determines the content of the leftmost gridline of the report. the rightbar gridline determines the content of the rightmost gridline of the report. The topsep determines the content of the line that separates the title labels in the top header area of the report from the raw data. The leftsep determines the line that separates the title labels in the left header area of a report from the raw data. The totalsset determines the line that separates totals from other data values. The Hgrid determines how horizontal lines should be applied to the data area of the report. The Vgrid determines how vertical lines should be applied to the data area of a report.

The genfont attribute determines the font style of all cells in a report unless the cells are defined by one or more of the other font properties. The toplabel font is the font for the top label area (column headers). The leftlabel font is the font for the left label area (row headers). The valuefont is the font of the data value area. The totalslabel is the value of the label of the totals area of the report. The totalsvalue is the font for the totals value of the report. The leveltop is the font for the top labels at a specific level. The levelleft font defines the font for the left labels at a specific level. The levelvalue is the font of the data values at a specific row level.

For banding, the level defines the level to which banding should be applied. The width defines the number of banding rows or columns that should be displayed with the same color. The darkcolor defines the dark band background color. The lightcolor defines the light band background color. The inlabel defines whether or not banding extends into the headers in the label areas.

Through selecting values for these attributes, the autoformat applies to define the format of a report in the workbook.

Autoprompt reports are reports that prompt the user to input some of the parameters, such as the filter criteria, for example, for the report when it is initiated.

Positioning a report within a worksheet may include vertical stacking which specifies the distance (in rows, for example) that the selected report may be placed from the report preceding it and the distance (in columns, for example) from the left sheet margin. If no report is specified above the selected report, then the system uses the top sheet margin as the bottom edge from which to count rows. Also, horizontal stacking may be provided which enables a user to specify the distance (in columns, for example) that the selected report should be placed from the report to the left of it and the distance (in rows, for example) from the top sheet margin. If no report is specified to the left of the selected report, then the system uses the left sheet margin as the edge from which to count columns. The system may also enable specification of the absolute cell reference from which the top left corner of the report is to be placed.

The next lower level format may be an attribute/element/metric level format which overrides the global and report level formats for certain attributes, elements, and metrics within a particular report. The next lower level format may comprise the value level format that overrides the global, report, and attribute/element/metric level format for a particular intersection of a metric and an element which establish a value.

Another level of formatting, a worksheet level formatting may also be applied. Worksheets may comprise collections of reports within the workbook and a worksheet level format may be provided between the global and report level formats described above.

These formatting options for the workbooks may be selected by the user through a graphical user interface in the network user interface, such as the web browser. This process may be part of the request for a report to be processed by the OLAP system. Input may be through use of known techniques including direct entry into a field, pull-down menus, button selection, or other such techniques. Further, the formats may be from predefined styles that provide the parameters of the format. The user may also be able to define styles through a graphical user interface by saving formats input for a workbook or report as a style for later use with other workbooks or reports.

Also, formatting may be provided by the user through scripting. The user may use scripting, such as through the use of VBA or other scripting systems, to do completely programmatic and specialized formatting. This is possible because the data hooks (or "metadata") related to how formatting is applied are provided as parameters that may be used in scripts to modify formats. Through scripting, general and maintainable formatting may be provided rather than requiring hard-coded formatting within a grid or graph generated as a report.

Workbooks may be implemented through leveraging spreadsheet application programs, such as Microsoft Excel™. Through these spreadsheet applications, formatting of multiple reports into a combined workbook may be provided. Accordingly, the programming language in the spreadsheet application may be used to configure the format and arrangement of reports within the workbook: For example, Visual Basic for Applications may be used in the Excel™ spreadsheet software application. This provides flexibility in formatting and combining reports to create new ones and in building an interactive spreadsheet application for the end user. For example, a spreadsheet application for a stock market workbook may provide pull-down menus for selecting different time ranges and industries which then update instantly/dynamically. Because these programming languages and spreadsheet programs, such as VBA and Excel are open standards, they are widely used and therefore, the usefulness of the workbook feature is enhanced.

Also, using Excel™, for example, enables users to select various properties and formatting for the reports that are to be generated. Integration of Excel™ with the invention allows users to use all of the functionality offered in Excel™ and to apply that functionality to the reports generated using the invention. For example, Excel™ offers existing macros that may be used to automate work flow or other features for the reports. Additionally, these macros may be modified or additional macros may be recorded to perform a specific operations desired by a user. The macros may be used, for example, to facilitate work flow. Generating reports in Excel™ also enables reports to display grids and graphs of the same report at the same time, display headers and footers, deliver multiple worksheets in a single workbook, support logical exceptions through use of overwriting rules, allows administrators to create formatted reports, etc.

Figure 5:
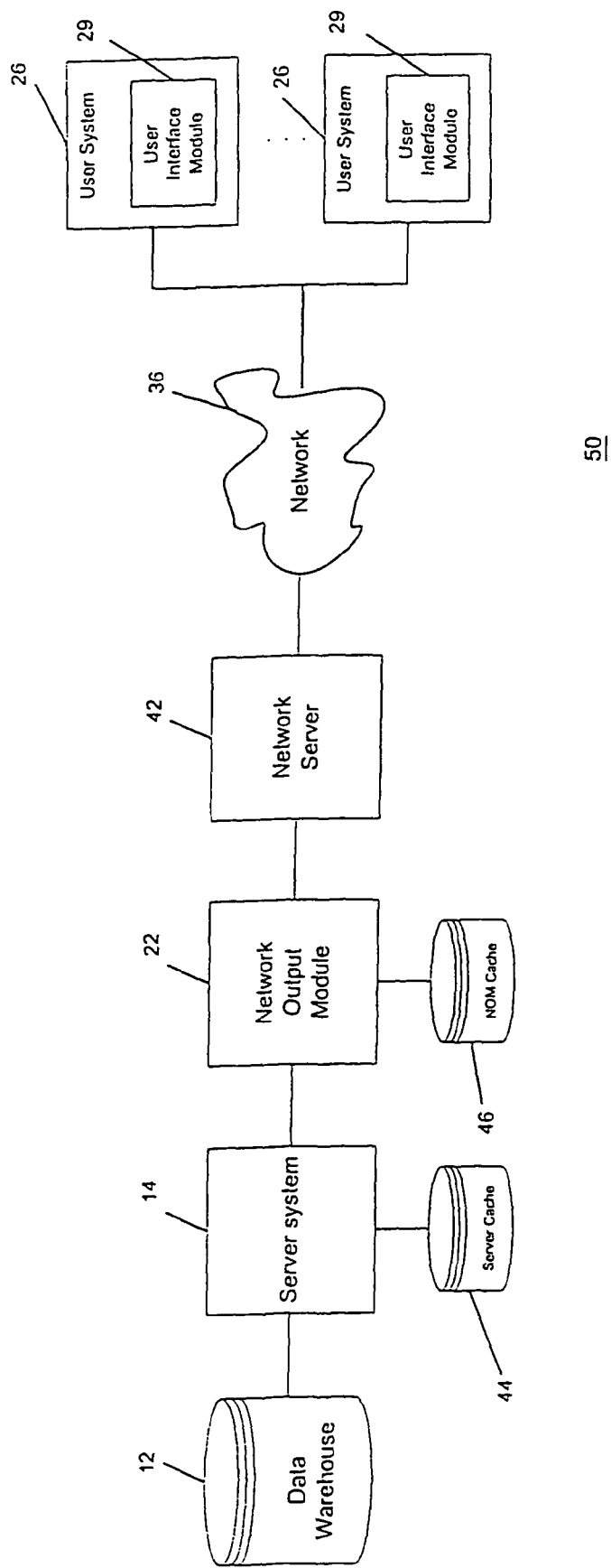
FIG. 5 is a schematic block diagram of an asynchronous report requesting network system in accordance with an embodiment of the invention.

A detailed embodiment of a system for enabling users to asynchronously generate report requests is depicted in FIG. 5. Such a system 50 comprises a data warehouse 12, server system 14, network output module 22, user systems 26, user interface modules 29 and network 36. Additionally, server system 14 may be connected to a server cache 44 and network output module 22 may be connected to a network output module cache 46. Further, a network server 42 may be provided to generate output from network output module 22 across network 36 to user systems 26.

In system 50, network 36 may comprise an intranet, the Internet or any other network system that enables communication between a server and user system such as servers 14 and 42 and user systems 26. Network server 42 may comprise a web server and user system 26 may comprise computers connected over the Internet and World Wide Web to web server 42.

Server cache 44 may be provided to store calculated report results in a relational database structure. By providing a server cache 44 with server system 14, complex business reports may be accessed with one simple server request statement rather than having to access data warehouse 12 each time that a complex business report is requested. Additionally, through the use of server cache 44, load balancing may be provided. Further, for security purposes, server cache 44 may be used to index result tables by filter/template combination and by user.

Network output module cache 46 may be provided to store dynamic web pages created to display report results in files through network server 42. Cache results in network output module 46 may retain links to data warehouse content for ad hoc reporting and drilling.

Various security level architectures may be employed, although not depicted in FIG. 5. For example, a database level security may be provided between data warehouse 12 and server system 14. A network security user validation module may be provided between network output module 22 and network server 42. Further, firewall and data encryption techniques may be provided within network 36 to prevent access to network server 42 from unqualified or unauthorized user systems 26. Also, an API may be provided to enable creation of further security level clearances to prevent user systems 26 access to data and data warehouse 12 for server cache 44 to which they do not have authorization.

Operation of system 50 may now be described. System 50 may enable users to request reports from server system 14 to be processed against data warehouse 12 through the use of a user interface module, such as a web browser operatively connected over the Internet to a network output module 22. As such a report may be requested by a user through user interface module 29 of user system 26.

To access the data warehouse, a user may first log in to network server 42 via user system 26. The user may do so by selecting a particular web site maintained by network server 42 or some other mechanism may be used. Network server 42 then presents the user with a view using user interface module 29 (e.g., a web browser) comprising one or more options. A view may comprise a page or series of pages from a website, for example. One option presented in the view may be a mechanism that enables a user to generate a report request through this mechanism in the view. User interface module 29 may be used to submit a request for a report selected by the user to network server 42 over network 36. Network server 42 communicates the request to network output module 22. Network output module 22 receives the request and formulates a report request to be sent to server system 14 for processing using data warehouse 12. Network output module 22 may also perform other steps, as described in detail below with respect to FIG. 3. Network output module 22 may also cooperate with an agent module operatively connected over system 50 to formulate a report. Server system 14 then accesses data warehouse 12 to perform all data retrieval and calculations to provide the report.

Network output module 22 may provide the functionality to determine whether a report request is the same or substantially the same as a previously requested report prior to forwarding a report to server system 14 for processing. Upon receipt of a report request, network output module 22 also controls network server 42 to present a new view to the user through user interface module 29 via network 36 while continuing to monitor progress of submitted reports identified for the particular user. This enables users to perform other tasks and thereby provides the asynchronous nature of the present invention. For example, the user may operate other views, pages, sites or any other action using user interface module 29, without having to wait for the report generation to be complete before being able to do so.

After the report generation is complete, server system 14 communicates the report to network output module 22. Network output module 22 prepares the report for presenting to the user(s) that requested the report using user interface module 29. As such, network output module 22 controls asynchronous processing of reports requested by the users.

Figure 6:
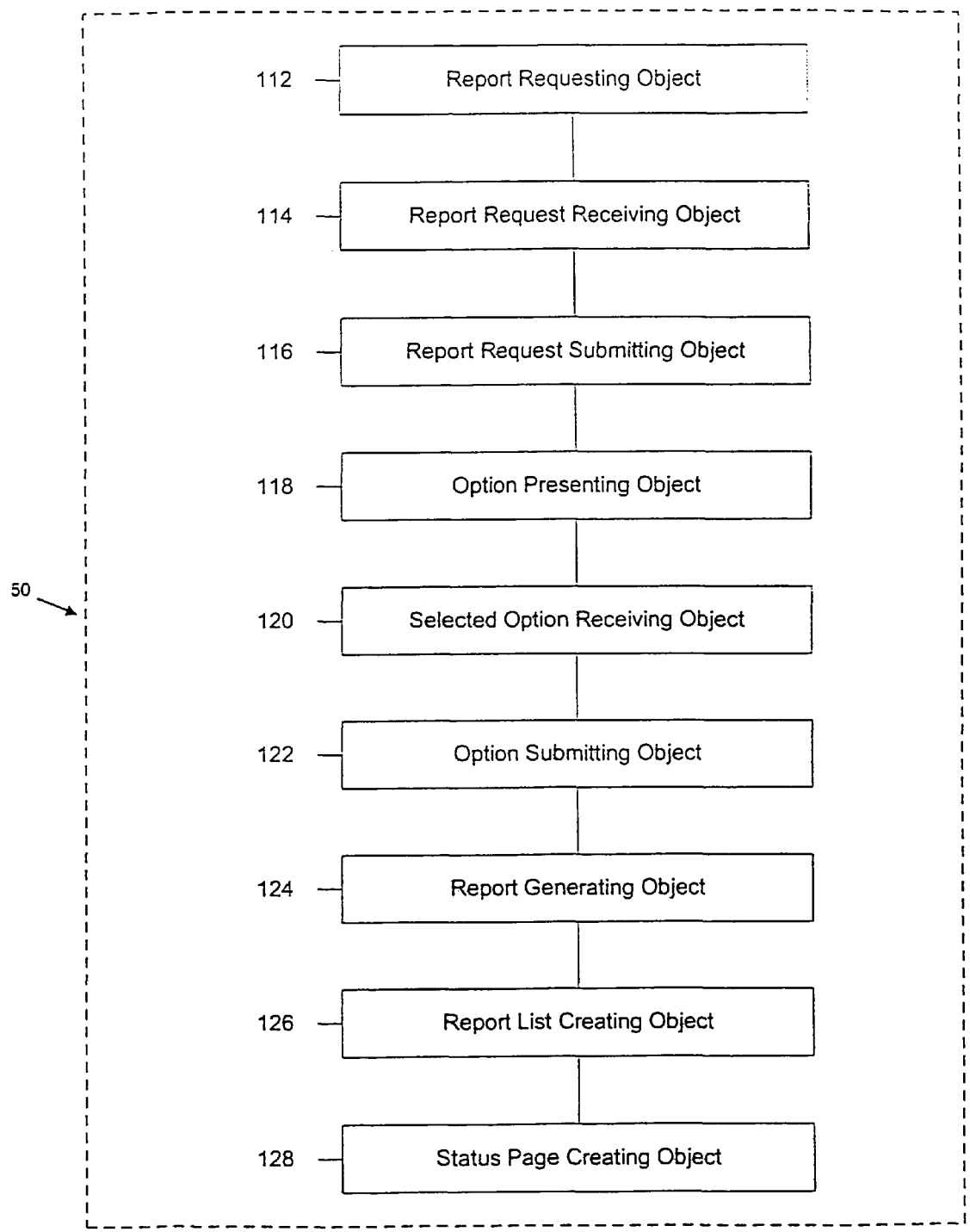
FIG. 6 is a schematic block diagram of system components in accordance with an embodiment of the invention.

FIG. 6 illustrates various components and objects of system 50 that perform tasks and functions described above. These objects may reside anywhere within system 50, but the location of each according to one embodiment is described as well. System 50 comprises a report requesting object 112, a report request receiving object 114, a report request submitting object 116, an option presenting object 118, a selected option receiving object 120, and a selected option submitting object 122. Report requesting object 112 communicates with report request receiving object 114 to enable a user to request a report to be generated. Report requesting object 112 may comprise functionality provided in a web page presented through user interface module 29. Report request receiving object 114 may comprise a module that is a portion of network output module 22. Report request submitting object 116 submits the user's report request for generation. Report request submitting object 116 may comprise an object that is a portion of network output module 22.

After a request has been submitted, option presenting object 118 may present various options for the report. Selected option receiving object 120 communicates with option presenting object 118 to select the option(s) selected by the user. Options may include specification of the name, content, project, filter, template and other components of a report as may be used by server system 14. Selected option submitting object 122 then submits the options selected by the user for processing. A report generating object 124 generates the requested report asynchronously based on the options selected by the system user. A report list creating object 126 creates a report which lists one or more reports requested. If a request for a report that has already been requested, network output module 22 adds the request, including an identification of the system user requesting the report, to the report entry without generating another report. A status page creating object 128 creates a status page which identifies the status of one or more requested reports. The status page may include options which may be selected by the system user (e.g., cancel request). Option presenting object 118 and selected option submitting object 122 may comprise functionality presented in a page to the user via user interface module 28. Other objects described may comprise components of network output module 22.

Through an administrator module within network output module 22, an administrator may also monitor performances of each report, filter reports by pending, error and completed requests, cancel or modify reports, and may resubmit a report if it creates an error. The administrator module may have restricted access to prevent users from canceling other user requests. The administrator module may also allow for setting global settings for the system. Further, the administrator module may also enable administrators to view history lists, status lists, and cancellation pages from the viewpoint of users on the system. This enables administrators to be able to see what the user is seeing and therefore, troubleshoot or answer questions about the performance and operation of the system.

As described above, therefore, the present invention provides the ability for users and system administrators to cancel report requests. If a user desires to cancel a report request, the user may submit a report request cancellation by, for example, clicking on a "cancel" button using a conventional computer mouse or by selecting "cancel" from a standard pull-down menu. After a report request cancellation has been submitted, the system removes the request for that user from the report entry in the report list and then determines whether any other requests by other users remain for that report entry. If the report entry contains additional requests for that report, the system continues generating the report. This method enables users to cancel respective report requests while continuing report generation for other system users. Additionally, this reduces system overhead by generating a single report for multiple requests. For example, if several users request the same report, only one report will be generated unlike prior systems where reports are generated for each request submitted by a user. For example, if ten users submitted a single request for the same report, ten reports would be generated. The invention, however, generates only one report that is used for each of the requests submitted by the ten (10) system users.

Another feature of the invention enables notification to a system user of a completed report. Once a report is generated, the system notifies the user that requested the report via e-mail, telephone, fax, pager, or other method that the report is completed. This may be done using known broadcast technology. For example, the invention may use. Microstrategy's DSS Broadcaster™ to implement this notification feature.

Users may request and format reports generated using standard spreadsheet software using a network interface device (e.g., a web browser). The web browser may be, for example, Microsoft Internet Explorer™, Netscape Navigator™, etc. Use of a web browser allows users to easily manipulate and generate reports without requiring the user to have a specific application loaded on the user system.

Figure 7:
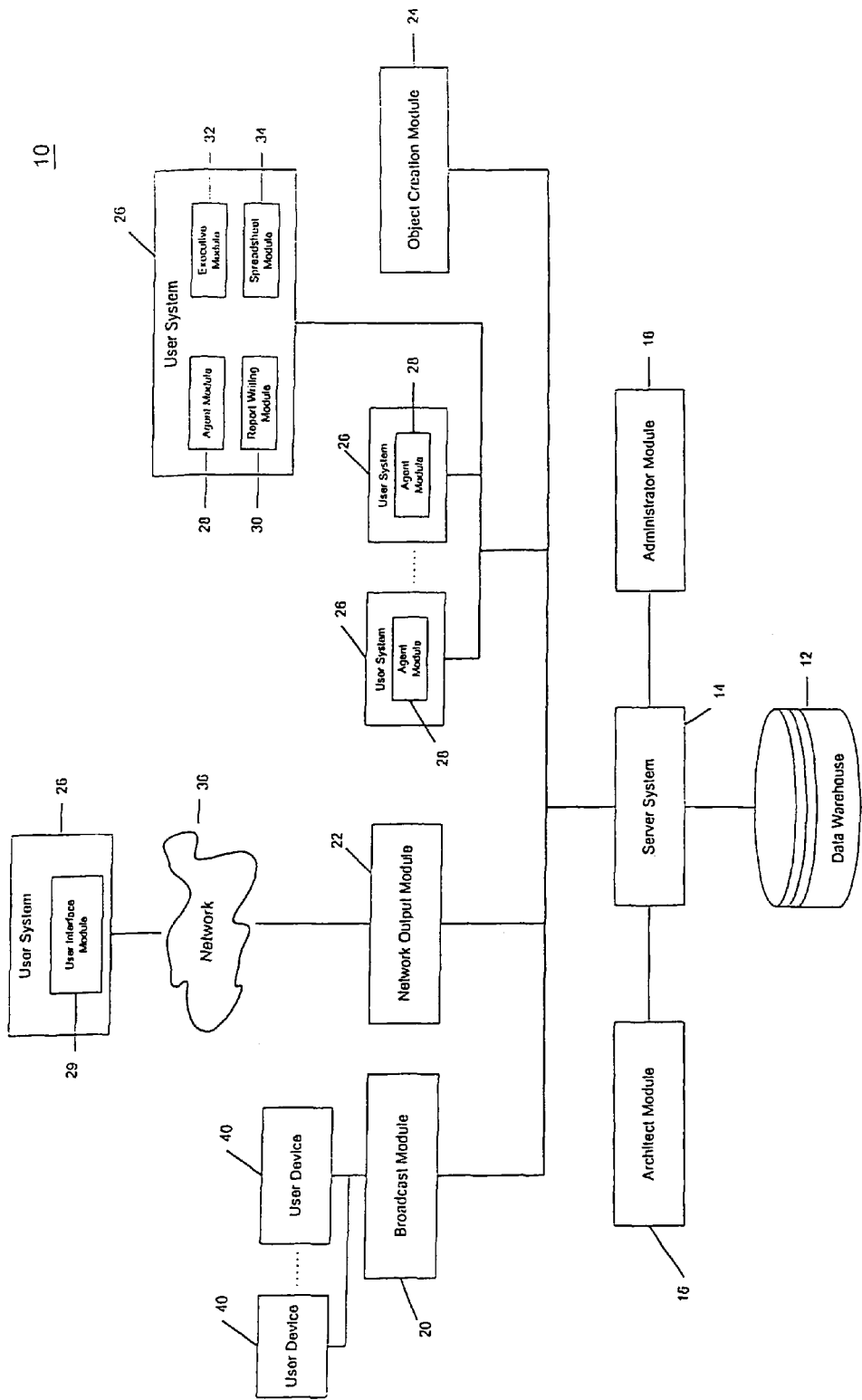
FIG. 7 is a schematic block diagram of a network-based system in which the asynchronous report generation system may operate in accordance with one embodiment of the invention.

The present invention may be used in an overall system comprising a plurality of other systems for OLAP and decision support. According to one embodiment of the invention, a decision support system 10 may be provided as depicted in FIG. 7. System 10 may comprise a data warehouse 12, a server system 14, an architect module 16, an administrator module 18, a broadcast module 20, a network output module 22, a plurality of user systems 26, and an object creation module 24. Data warehouse 12 may comprise any data warehouse or data mart as is known in the art, including a relational database management system ("RDBMS") or a multidimensional database management system ("MDBMS") or a hybrid of the two. As discussed above, data warehouse 12 consolidates source system transaction data, organizes that data by business subject areas called dimensions and often includes data history for long term periods, such as two to five years. A data mart includes dimensions which tend toward application-specific subjects instead of integrating the entire business in one database such as departmental analysis data, data mining, and mass mailing lists.

Server system 14 comprises an OLAP server system for accessing and managing data stored in data warehouse 12. Server system 14 may comprise a ROLAP engine, MOLAP engine or a HOLAP engine according to different embodiments. Specifically, server system 14 may comprise a multi-threaded server for performing sophisticated analysis directly against data warehouse 12. One embodiment of server system 14 may comprise a ROLAP engine known as DSS Server™ offered by MicroStrategy.

Architect module 16 may comprise a module that enables developers to create and maintain data and metadata in data warehouse 12. Metadata may be considered to be data about data, such as data element descriptions, data type descriptions, attributes/property descriptions, range/domain descriptions, and process/method descriptions. Data and metadata stored in data warehouse 12 may thus be modified and organized by architect module 16. According to one embodiment of the invention, architect module 16 may comprise a software package known as DSS Architect™ offered by MicroStrategy.

Administrator module 18 may comprise a module for facilitating the development, deployment and management of data warehouse applications supporting large volumes of users over various distribution mechanisms. Administrator module 18 may comprise an object manager and a warehouse monitor. The object manager allows objects to be shared across databases for easy migration from development to production. The warehouse monitor provides performance monitoring and management tools to support thousands of users across a distributive database environment. The warehouse monitor collects statistics for the purpose of identifying performance bottlenecks, warehouse tuning, and cost analysis. According to one embodiment of the invention, administrator module 18 may comprise a module known as DSS Administrator™ offered by MicroStrategy.

Server system 14 also connects to an object creation module 24. Object creation module 24 may comprise a component object model ("COM") application program interface (API) for custom decision support development. According to one embodiment of the invention, object creation module 24 may comprise a software module known as DSS Objects™ offered by MicroStrategy. Additionally, custom applications may interface with object creation module 24 including Delphi, Visual Basic, and C++ programming modules.

Server system 14 also interfaces with a number of devices that enable users to access the contents of the data warehouse to perform various data analyses. One embodiment of such a system comprises a user system 26 with an agent module 28 operating thereon. Agent module 28 may comprise a decision support interface to enable a user to provide integrated query and reporting, powerful analytics, and decision support through any standard user system 26.

Agent module 28 may operate on any user system including personal computers, network workstations, laptop computers or any other electronic device connected to server system 14. Agent module 28 may enable the user to define queries to be performed against the data contained in data warehouse 12 using components, templates, filters, reports, agents, etc. Components may include dimensions, attributes, attribute elements, and metrics; in other words, the building blocks for templates, filters, and reports. Templates generally define a report format and specify the attributes, dimensions, metrics, and display properties comprising a report. Filters generally qualify report content and identify the subset of data warehouse 12 to be included in a report. Reports are generally understood to be a data analysis created by combining a template (the format) with a filter (the content). Agents are a group of reports cached on a time- or event-based schedule for rapid retrieval and batch processing.

Accordingly, agent module 28 enables a user access to the contents of data warehouse 12 to provide detailed analysis on an ad hoc basis. According to one embodiment of the invention, agent module 28 may comprise a software package known as DSS Agent™ offered by MicroStrategy. One of the advantages of DSS Agent™ includes its use of a ROLAP architecture on server system 14 and a RDBMS in data warehouse 12 to provide a more scaleable environment. Through DSS Agent™, a user can "drill down" which allows the user to dynamically change the level of detail in a report. Drilling down allows the user to drill to a lower level attribute so that the resulting report displays data with a greater level of detail. For example, one can drill down from year to month to week to day. DSS Agent™ also enables users to "drill up" to a higher level attribute. Drilling up summarizes the selected data to a higher level total. For example, one can drill from day to week to month to year. DSS Agent™ also enables a user to "drill within." Drilling within allows a user to go to a different hierarchy within the same dimension. Drilling within is often used to examine the characteristics of selected data. For example, drilling within enables a user to drill from item to color when looking at a particular retail item such as an automobile, clothing or the like. Drilling across allows the user to drill to an altogether different dimension or subject area. For example, one can drill across from a region to a month. Accordingly, through use of agent module 28, server system 14, and data warehouse 12, drilling is a powerful tool that is easily implemented using a ROLAP architecture which is not as easily accessible in MOLAP unless a user also implements the complicated structure of a HOLAP architecture.

Along with agent module 28, user system 26 may also include a report writing module 30, an executive module 32, and a spreadsheet module 34. Report writing module 26 may comprise an OLAP report writer. Executive module 32 may comprise a module design tool for developing custom EIS applications. This module is a design tool for developing briefing books that provide high level users with a series of views that describe their business. Once created, end users can access briefing books through agent module 28 in EIS mode. Such a system is easily implemented with agent module 28 by compiling sets of analyses into dynamic pages that immediately focus users on their key business drivers. One embodiment of executive module 32 may comprise the software made DSS Executive™ offered by MicroStrategy.

Spreadsheet module 34 may comprise an add on to existing spreadsheet programs or may comprise an entirely new spreadsheet program. Spreadsheet module 34 may enable reports and analyses generated from agent module 28 to be presented in a traditional spreadsheet program format to enable users to view results in preexisting front end interfaces. Spreadsheet module 34 may comprise the Microsoft Excel™ spreadsheet program offered by Microsoft and an Excel™ Add-In program offered by MicroStrategy.

Another module for accessing content of server system 14 may comprise a network output module 22. Network output module 22 offers the advantage of enabling user system 26 access to server system 14 in data warehouse 12 without requiring an additional agent module 28 to be stored on user system 26. Instead, user system 26 may have a user interface module 38 residing on user system 26. User interface module 38 may comprise any module that enables a user system to interface with the network output module over a network 36. According to one embodiment of the invention, network 36 may comprise an intranet or the Internet or other developed Internet-type networks. Further, user interface module 38 may comprise any standard browser module such as Microsoft Internet Explorer™ or Netscape Navigator™. As most user systems 26 already have a user interface module 38 stored and operating thereon, network output module 22 offers the advantage of enabling users access to server system 14 in data warehouse 12 without learning to operate a new module such as agent module 28. One embodiment of network output module 22 may comprise a web-based module called DSS Web™ offered by MicroStrategy. Accordingly, in one embodiment, a user can access server system 14 through a standard web browser, such as Microsoft Internet Explorer™, over the Internet through network output module 22, such as DSS Web™

In this embodiment, network output module 22 may comprise a World Wide Web tool used in conjunction with server system 14 for allowing users to deploy data warehouse/decision support applications over the Internet using industry standard World Wide Web browsers as a client. As a result, a user can access the data warehouse with little or no client maintenance, little or no software to install, and only a small amount of additional training while still maintaining all of the capabilities of agent module 28. One embodiment of such a network output module 22 comprises DSS Web™ offered by MicroStrategy. Such an embodiment provides a broad array of options for viewing information sets, such as spreadsheet grids and a wide variety of graphs. Through this module's exceptional reporting capabilities, users receive key elements of a report in easily interpretable, plain messages. This module also allows users to "drill" dynamically to a lower level of detail to view the underlying information or to create and save new analyses. For sensitive information, this module provides security plug-ins that allow the user to extend the standard security functionality with additional user authentication routines. This module may also provide an interface API that allows users to customize, integrate, and imbed this functionality into other applications. For example, the data syndicator for health care information could utilize this module with a customize interface to sell access to health care information to Health Maintenance Organizations, hospitals, and pharmacies.

Another module that enables user access to the data warehouse 12 comprises a broadcast module 20. Broadcast module 20 may comprise an information broadcast server designed to deliver personalized messages to multiple recipients via user devices 40. User devices 40 may comprise electronic mail, facsimile, pager, mobile phone, telephone, and multiple other types of user information devices. Broadcast module 20, like agent module 28 and network output module 22, enables users to define queries and reports that are to be run against server system 14 and data warehouse 12. Broadcast module 20 may then send personalized information to users at predefined intervals or when criteria specified in their reports exceed predefined thresholds. Broadcast module 20 may continually monitor and run such reports to enable users to receive appropriate information as it becomes available. Broadcast module 20 may also personalize the report to ensure that users see only that portion of a report that is relative to that user and thereby frees analysts from acting as the information provider. Broadcast module 20 may also provide a wide range of content formatting options to enable users to receive information in a form that they can best understand. One such formatting may include formatting a request for a pager, facsimile, mobile phone, electronic mail, web or other output user device 40.

Broadcast module 20 may specify a mechanism called a service for generating information and a subscription that determines which users receive information from which service. Accordingly, a service may be tied to, for example, a specific report, series of reports or elements within a report, etc. Also, subscribers may include users, groups of users or only specific user devices 40 for a particular user. Broadcast module 20 may output information to user devices 40 using push technology. In other words, as soon as a criteria is established, broadcast module 20 generates a report to a user device 40. Accordingly, a user can thus have up-to-date information about the contents of data warehouse 12 without having to submit a query or log-in to a software module such as agent module 28 or network output module 22 to initiate the query.

In such an overall system, the present invention may enable asynchronous report generation through operation of network output module system 22 as described above. Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A system for presenting reports processed by an on-line analytical processing (OLAP) system over a network, the system comprising:
   at least one physical processing device that executes one or more computer program modules that:
   receive, from a user system through a web browser, a request for a workbook comprising a plurality of reports and a selection of one or more specified templates or filter combinations to format one or more of the plurality of reports;
   return control of the web browser to enable a user to use the web browser to perform one or more other tasks while the workbook request is being processed, wherein the one or more other tasks includes requesting an additional workbook;
   receive the workbook comprising the plurality of reports processed by the OLAP system in response to the workbook request;
   format one or more of the plurality of reports in the workbook in accordance with the selected one or more specified template or filter combinations received from the user system through the web browser in communication with the OLAP system over the network;
   build an interactive spreadsheet application for presenting the workbook at the web browser of the user system, wherein the interactive spreadsheet application configures an arrangement of the plurality of formatted reports in the workbook; and
   transmit the workbook including the plurality of formatted reports within a page over the network to the web browser of the user system through which the request was received, wherein the transmitted workbook is presented at the user system using the interactive spreadsheet application displayed within the web browser.

2. The system of claim 1, wherein the one or more template or filter combinations specify a plurality of format levels used to format the plurality of reports in the workbook.

3. The system of claim 2, wherein the plurality of format levels are used to format the plurality of reports in the workbook in a hierarchical order, wherein the hierarchical formatting order includes superseding at least one of the plurality of format levels that are higher in the hierarchical order with at least one of the plurality of format levels that are lower in the hierarchical order.

4. The system of claim 3, wherein the plurality of format levels comprise a global format level, a worksheet format level, a report format level, an attribute, element, and metric format level, and a value format level in that hierarchical order, whereby the global format level is highest in the hierarchical order and the value format level is lowest in the hierarchical order.

5. The system of claim 1, wherein the one or more template or filter combinations specify a merged format used to format the plurality of reports in the workbook.

6. The system of claim 1, wherein the one or more template or filter combinations specify a combined grid and graph format used to format the plurality of reports in the workbook.

7. The system of claim 1, wherein the one or more template or filter combinations specify one or more rules used to format one or more of the plurality of reports in the workbook, wherein the one or more reports to be formatted using the one or more rules are specified at the user system through the web browser.

8. The system of claim 1, wherein the one or more template or filter combinations specify one or more predefined formats used to format the plurality of reports in the workbook.

9. The system of claim 1, wherein the one or more template or filter combinations specify one or more scripts used to format the plurality of reports in the workbook, wherein the one or more scripts are created at the user system and specified through the web browser.

10. A computer-implemented method of presenting reports processed by an on-line analytical processing (OLAP) system over a network, the method being implemented by a computer that includes a physical processor, the method comprising:
   receiving, from a user system through a web browser, a request for a workbook comprising a plurality of reports and a selection of one or more specified templates or filter combinations to format one or more of the plurality of reports;
   returning control of the web browser to enable a user to use the web browser to perform one or more other tasks while the workbook request is being processed, wherein the one or more other tasks includes requesting an additional workbook;
   receiving the workbook comprising the plurality of reports processed by the OLAP system in response to the workbook request;
   formatting one or more of the plurality of reports in the workbook in accordance with the selected one or more specified template or filter combinations received from the user system through the web browser in communication with the OLAP system over the network;
   building an interactive spreadsheet application for presenting the workbook at the web browser of the user system, wherein the interactive spreadsheet application configures an arrangement of the plurality of formatted reports in the workbook; and
   transmitting the workbook including the plurality of formatted reports within a page over the network to the web browser of the user system through which the request was received, wherein the transmitted workbook is presented at the user system using the interactive spreadsheet application displayed within the web browser.

11. The method of claim 10, wherein the one or more template or filter combinations specify a plurality of format levels used to format the plurality of reports in the workbook.

12. The method of claim 11, wherein the plurality of format levels are used to format the plurality of reports in the workbook in a hierarchical order, wherein the hierarchical formatting order includes superseding at least one of the plurality of format levels that are higher in the hierarchical order with at least one of the plurality of format levels that are lower in the hierarchical order.

13. The method of claim 12, wherein the plurality of format levels comprise a global format level, a worksheet format level, a report format level, an attribute, element, and metric format level, and a value format level in that hierarchical order, whereby the global format level is highest in the hierarchical order and the value format level is lowest in the hierarchical order.

14. The method of claim 10, wherein the one or more template or filter combinations specify a merged format used to format the plurality of reports in the workbook.

15. The method of claim 10, wherein the one or more template or filter combinations specify a combined grid and graph format used to format the plurality of reports in the workbook.

16. The method of claim 10, wherein the one or more template or filter combinations specify one or more rules used to format one or more of the plurality of reports in the workbook, wherein the one or more reports to be formatted using the one or more rules are specified at the user system through the web browser.

17. The method of claim 10, wherein the one or more template or filter combinations specify one or more predefined formats used to format the plurality of reports in the workbook.

18. The method of claim 10, wherein the one or more template or filter combinations specify one or more scripts used to format the plurality of reports in the workbook, wherein the one or more scripts are created at the user system and specified through the web browser.

19. An electronic device comprising a non-transitory computer usable storage medium having computer-executable code embodied therein for presenting reports processed by an on-line analytical processing (OLAP) over a network, wherein executing the computer-executable code on a physical processor coupled to the electronic device causes the electronic device to:
   receive, from a user system through a web browser, a request for a workbook comprising a plurality of reports and a selection of one or more specified templates or filter combinations to format one or more of the plurality of reports;
   return control of the web browser to enable a user to use the web browser to perform one or more other tasks while the workbook request is being processed, wherein the one or more other tasks includes requesting an additional workbook;
   receive the workbook comprising the plurality of reports processed by the OLAP system in response to the request for the workbook;
   format one or more of the plurality of reports in the workbook in accordance with the selected one or more specified template or filter combinations received from the user system through the web browser in communication with the OLAP system over the network;
   build an interactive spreadsheet application for presenting the workbook at the web browser of the user system, wherein the interactive spreadsheet application configures an arrangement of the plurality of formatted reports in the workbook; and
   transmit the workbook including the plurality of formatted reports within a page over the network to the web browser of the user system through which the request was received, wherein the transmitted workbook is presented at the user system using the interactive spreadsheet application displayed within the web browser.

20. The electronic device of claim 19, wherein the one or more template or filter combinations specify a plurality of format levels used to format the plurality of reports in the workbook.

21. The electronic device of claim 20, wherein the plurality of format levels are used to format the plurality of reports in the workbook in a hierarchical order, wherein the hierarchical formatting order includes superseding at least one of the plurality of format levels that are higher in the hierarchical order with at least one of the plurality of format levels that are lower in the hierarchical order.

22. The electronic device of claim 21, wherein the plurality of format levels comprise a global format level, a worksheet format level, a report format level, an attribute, element, and metric format level, and a value format level in that hierarchical order, whereby the global format level is highest in the hierarchical order and the value format level is lowest in the hierarchical order.

23. The electronic device of claim 19, wherein the one or more template or filter combinations specify a merged format used to format the plurality of reports in the workbook.

24. The electronic device of claim 19, wherein the one or more template or filter combinations specify a combined grid and graph format used to format the plurality of reports in the workbook.

25. The electronic device of claim 19, wherein the one or more template or filter combinations specify one or more predefined formats used to format the plurality of reports in the workbook.

26. The electronic device of claim 19, wherein the one or more template or filter combinations specify one or more rules used to format one or more of the plurality of reports in the workbook, wherein the one or more reports to be formatted using the one or more rules are specified at the user system through the web browser.

27. The electronic device of claim 19, wherein the one or more template or filter combinations specify one or more scripts used to format the plurality of reports in the workbook, wherein the one or more scripts are created at the user system and specified through the web browser.

28. A non-transitory computer usable storage medium having computer readable program code embodied therein for presenting reports processed by an on-line analytical processing (OLAP) over a network, wherein the computer readable program code executes on one or more physical computing devices, and wherein executing the computer readable program code on the one or more physical computing devices causes the one or more physical computing devices to:

receive, from a user system through a web browser, a request for a workbook comprising a plurality of reports and a selection of one or more specified templates or filter combinations to format one or more of the plurality of reports;

return control of the web browser to enable a user to use the web browser to perform one or more other tasks while the workbook request is being processed, wherein the one or more other tasks includes requesting an additional workbook;

receive the workbook comprising the plurality of reports processed by the OLAP system in response to the request for the workbook;

format one or more of the plurality of reports in the workbook in accordance with the selected one or more template or filter combinations received from the user system through the web browser in communication with the OLAP system over the network, wherein the one or more template or filter combinations specify a plurality of format levels used to format the plurality of reports in the workbook in a hierarchical order;

build an interactive spreadsheet application for presenting the workbook at the web browser of the user system, wherein the interactive spreadsheet application configures an arrangement of the plurality of formatted reports in the workbook; and transmit the workbook including the plurality of formatted reports within a page over the network to the web browser of the user system through which the request was received, wherein the transmitted workbook is presented at the user system using the interactive spreadsheet application displayed within the web browser.

\* \* \* \* \*